US012723821B2

(12) United States Patent
Hu et al.

(10) Patent No.: US 12,723,821 B2
(45) Date of Patent: Sep. 1, 2026

(54) HEAT EXCHANGE ASSEMBLY

(71) Applicant: ZHEJIANG SANHUA AUTOMOTIVE COMPONENTS CO., LTD., Hangzhou (CN)

(72) Inventors: Meiyan Hu, Hangzhou (CN); Bin Song, Hangzhou (CN); Linzhong Wu, Hangzhou (CN); Yunpeng Wang, Hangzhou (CN); Zhengyi Yin, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 561 days.

(21) Appl. No.: 18/008,313

(22) PCT Filed: Jul. 23, 2021

(86) PCT No.: PCT/CN2021/108077
§ 371 (c)(1),
(2) Date: Dec. 5, 2022

(87) PCT Pub. No.: WO2022/022409
PCT Pub. Date: Feb. 3, 2022

(65) Prior Publication Data

US 2023/0204298 A1 Jun. 29, 2023

(30) Foreign Application Priority Data

Jul. 25, 2020 (CN) ......................... 202010726730.5

(51) Int. Cl.
*F28D 9/00* (2006.01)
*B60H 1/00* (2006.01)
(Continued)

(52) U.S. Cl.
CPC ....... *F28D 9/0093* (2013.01); *B60H 1/00328* (2013.01); *B60H 1/00342* (2013.01);
(Continued)

(58) Field of Classification Search
CPC ...... F28D 9/005; F28D 9/0075; F28D 9/0093; F28D 9/0037; F28F 3/086; F28F 3/08; F25B 39/02; F25B 39/022
See application file for complete search history.

(56) References Cited

U.S. PATENT DOCUMENTS 5,727,623 A * 3/1998 Yoshioka ............ B01D 53/265
62/93
5,931,224 A 8/1999 Chevallier
(Continued)

FOREIGN PATENT DOCUMENTS

CA 2960157 A1 3/2016
CN 102916234 A 2/2013
(Continued)

OTHER PUBLICATIONS

Korean Office Action dated Nov. 20, 2024 for Korean Application No. 10-2022-7046428.

(Continued)

*Primary Examiner* — Jianying C Atkisson
*Assistant Examiner* — For K Ling
(74) *Attorney, Agent, or Firm* — Ohlandt, Greeley and Perle, L.L.P.

(57) ABSTRACT

A heat exchange assembly, which comprises a first heat exchange part, a bridge, and a second heat exchange part, wherein the bridge is at least partially located between the first heat exchange part and the second heat exchange part; the bridge comprises two holes or grooves that face the first heat exchange part and may communicate with the first heat exchange part; the bridge comprises two holes or grooves
(Continued)

that face the second heat exchange part and may communicate with the second heat exchange part; the bridge further comprises a third interface part provided with a third interface; and the bridge has a hole and/or groove that is in communication with the third interface.

20 Claims, 29 Drawing Sheets

(51) Int. Cl.

| | |
|---|---|
| ***B60H 1/32*** | (2006.01) |
| ***B60L 58/26*** | (2019.01) |
| ***F28D 21/00*** | (2006.01) |
| ***F28F 3/08*** | (2006.01) |
| ***F28F 9/02*** | (2006.01) |
| ***F28F 9/26*** | (2006.01) |
| ***F28F 13/06*** | (2006.01) |
| ***F28F 27/02*** | (2006.01) |
| ***H01M 10/613*** | (2014.01) |
| ***H01M 10/625*** | (2014.01) |
| ***H01M 10/655*** | (2014.01) |
| ***H01M 10/6567*** | (2014.01) |
| *B60K 1/00* | (2006.01) |
| *B60K 11/02* | (2006.01) |
| *F25B 39/02* | (2006.01) |

(52) U.S. Cl.

CPC ............ *B60H 1/3229* (2013.01); *B60L 58/26* (2019.02); *F28D 9/0037* (2013.01); *F28D 9/005* (2013.01); *F28D 9/0075* (2013.01); *F28F 3/086* (2013.01); *F28F 9/0253* (2013.01); *F28F 9/26* (2013.01); *F28F 13/06* (2013.01); *F28F 27/02* (2013.01); *H01M 10/613* (2015.04); *H01M 10/625* (2015.04); *H01M 10/655* (2015.04); *H01M 10/6567* (2015.04); *B60H 1/3227* (2013.01); *B60K 1/00* (2013.01); *B60K 2001/005* (2013.01); *B60K 11/02* (2013.01); *F25B 39/022* (2013.01); *F28D 2021/0084* (2013.01); *F28D 2021/0085* (2013.01); *Y02E 60/10* (2013.01); *Y02T 10/70* (2013.01)

(56) References Cited

U.S. PATENT DOCUMENTS

| | | | | |
|---|---|---|---|---|
| 8,166,666 | B2 * | 5/2012 | Felgenhauer ........... | F28D 9/005 34/182 |
| 2013/0034767 | A1 | 2/2013 | Pentapati et al. | |
| 2014/0013787 | A1 * | 1/2014 | Wesner ................... | F28D 9/005 62/239 |
| 2014/0284034 | A1 | 9/2014 | Kadle et al. | |
| 2015/0369115 | A1 * | 12/2015 | Kim ........................ | F28F 27/02 165/103 |
| 2016/0072165 | A1 | 3/2016 | Abels et al. | |
| 2016/0160813 | A1 * | 6/2016 | Amaral ................ | F02M 31/102 123/557 |
| 2016/0356205 | A1 * | 12/2016 | Braun ................. | F02B 29/0412 |
| 2017/0038151 | A1 * | 2/2017 | Noda .................... | F28F 9/0251 |
| 2018/0080693 | A1 * | 3/2018 | Wang .................. | H01M 10/625 |
| 2018/0274406 | A1 * | 9/2018 | Dries ..................... | F01M 5/007 |
| 2020/0031197 | A1 | 1/2020 | Chen et al. | |
| 2020/0031198 | A1 * | 1/2020 | Chen .................. | B60H 1/00278 |
| 2020/0318919 | A1 * | 10/2020 | Tonellato .............. | F28D 9/0037 |
| 2021/0325131 | A1 * | 10/2021 | Tonellato ................ | F28D 9/005 |
| 2022/0364793 | A1 * | 11/2022 | Chen ..................... | F28F 9/0265 |
| 2023/0311612 | A1 * | 10/2023 | Denoual ............ | B60H 1/00807 165/167 |

FOREIGN PATENT DOCUMENTS

| | | | |
|---|---|---|---|
| CN | 107796140 | A | 3/2018 |
| CN | 208139903 | U | 11/2018 |
| CN | 110073164 | A | 7/2019 |
| CN | 1110411247 | A | 11/2019 |
| EP | 1279904 | A2 | 1/2003 |
| KR | 20190023263 | A | 3/2019 |
| KR | 20190046989 | A | 5/2019 |

OTHER PUBLICATIONS

International Search Report dated Sep. 6, 2021 for PCT Appl. No. PCT/CN2021/108077.

* cited by examiner

HEAT EXCHANGE ASSEMBLY

This disclosure is a national phase application of PCT international patent application PCT/CN2021/108077, filed on Jul. 23, 2021, which claims priority of Chinese Patent Disclosure No. 202010726730.5, titled "HEAT EXCHANGE ASSEMBLY AND VEHICLE THERMAL MANAGEMENT SYSTEM", filed with the China National Intellectual Property Administration on Jul. 25, 2020, both of which are incorporated herein by reference in their entireties.

FIELD

The present disclosure relates to the field of fluid control, and in particular to a heat exchange assembly.

BACKGROUND

Some thermal management systems include no less than two heat exchangers, such as plate evaporators. These heat exchangers and components are generally connected by pipelines and fixed in the system. In addition, due to the large number of components in the system, the connection of pipelines in the system is relatively complex.

SUMMARY

To provide a heat exchange assembly with relatively simple connection during system connection, the following technical solution is provided according to the present disclosure:

a heat exchange assembly, including a first heat exchange part, a bridging member and a second heat exchange part, where the bridging member is at least partially located between the first heat exchange part and the second heat exchange part, the first heat exchange part, the bridging member and the second heat exchange part are fixed by welding; the first heat exchange part has a heat exchange core body, the first heat exchange part includes at least two fluid flow passages, and there is no communication between the two fluid flow passages; the heat exchange assembly includes a first port, a second port, and a third port; the first heat exchange part includes a first port part and a second port part; the first port part has the first port, and the second port part has the second port; the bridging member includes a third port part, the third port part is provided with the third port; the bridging member includes a hole and/or a groove in communication with the third port, the hole and/or groove of the bridging member being in communication with the third port is at least in communication with the duct for communication of one of the first heat exchange part and the second heat exchange part; the bridging member includes two holes or grooves facing the first heat exchange part for communication; the bridging member includes at least two holes or grooves that are able to be in communication with the second heat exchange part, the openings of the holes or grooves of the bridging member that capable of being in communication with the second heat exchange part face the second heat exchange part.

The flow passage herein includes a flow passage formed by a single component, and also includes a flow passage formed by combining two or more components. For example, the sixth port is in communication with the fourth port through the flow passages, which include a flow passage passing through the connecting member itself; a flow passage formed by the space at which the groove of the connecting member facing the second heat exchange part is positioned, after the connecting member is fixed with the second heat exchange part; a flow passage formed by the concave space of the second heat exchange part after the connecting member is fixed with the second heat exchange part; and even a flow passage formed by the combination of the connecting member and the second heat exchange part and other components, etc. The holes and/or grooves facing the first heat exchange part for communication include various modes: holes for communication, grooves for communication, combination of holes and grooves, combination of holes and holes, combination of grooves and grooves and more. The same applies to the case of the holes and/or grooves in communication with the second heat exchange part, which can be the cases that the hole is in communication with the second heat exchange part, the groove is in communication with the second heat exchange part, or both the hole and the groove are in communication with the second heat exchange part. The communication here also includes a direct communication and an indirect communication. The bridging member includes two holes or grooves for communication towards or close to the first heat exchange part. The bridging member includes at least two holes and/or grooves capable of being in communication with the second heat exchange part. The holes or grooves facing the first heat exchange part for communication does not excluded the case for being in communication with the second heat exchange part. If the holes or grooves are in the form of through hole, they can both face the first heat exchange part, or they can face the second heat exchange part and be in communication with the second heat exchange part. The communication between the two heat exchange parts through a pipeline or others is not an exclusion description in this specification, that is, the expression "two parts are in communication with" further indicates that other components can be provided between the two heat exchange parts, such as throttling elements, separators, control valves, check valves, heat exchangers, and the like.

The fluid communication between the two heat exchange parts can be realized relatively conveniently through the bridging member, different system requirements can be realized by changing the structure of the bridging member, the system pipeline is simple, the number of pipelines between the ports can be reduced, and the system connection is simple and convenient. In addition, as the third port part is arranged on the bridging member, it may reduce the number of ports of other components.

DETAILED DESCRIPTION OF THE EMBODIMENTS

Figure 1:
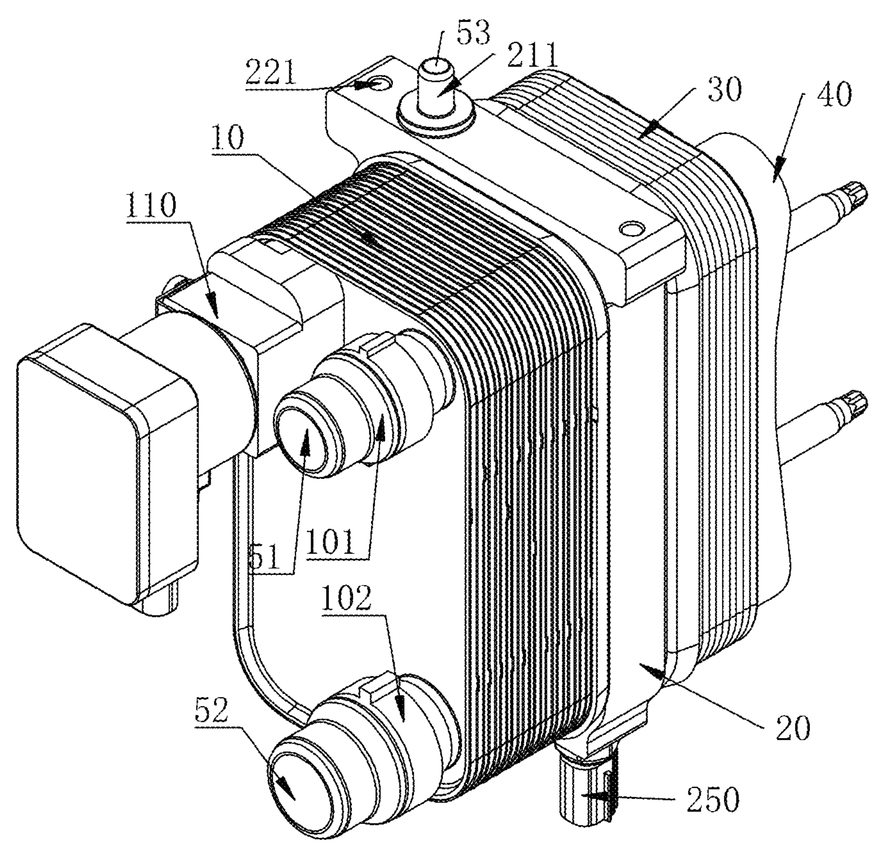
FIG. 1 and FIG. 2 are schematic perspective views from two directions of the first embodiment of the heat exchange assembly provided by the present disclosure.
Figure 2:
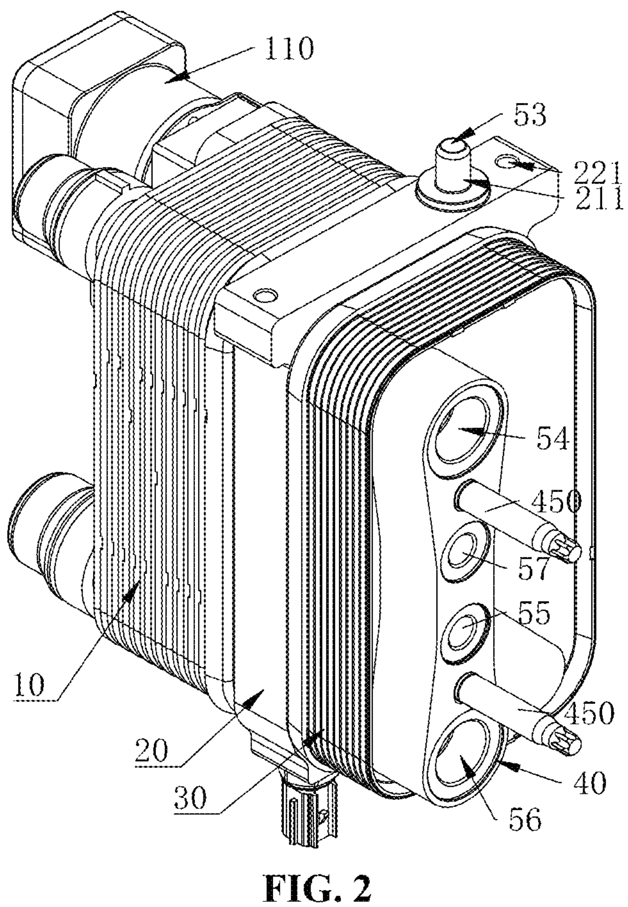
Figure 3:
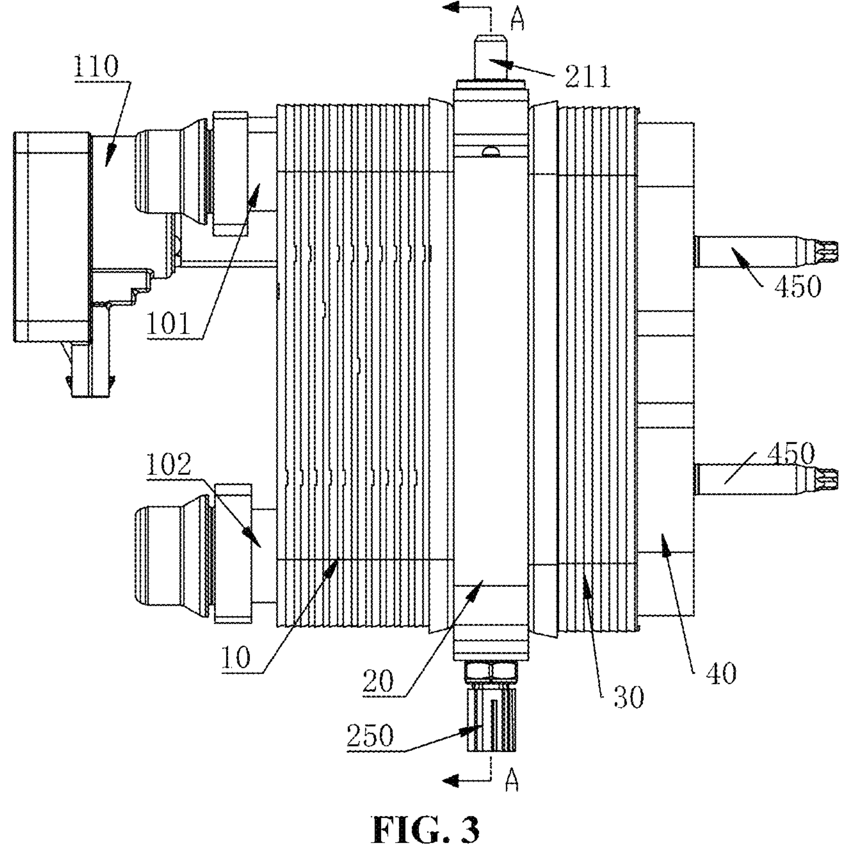
FIG. 3 is a schematic front view of the heat exchange assembly shown in FIG. 1.
Figure 4:
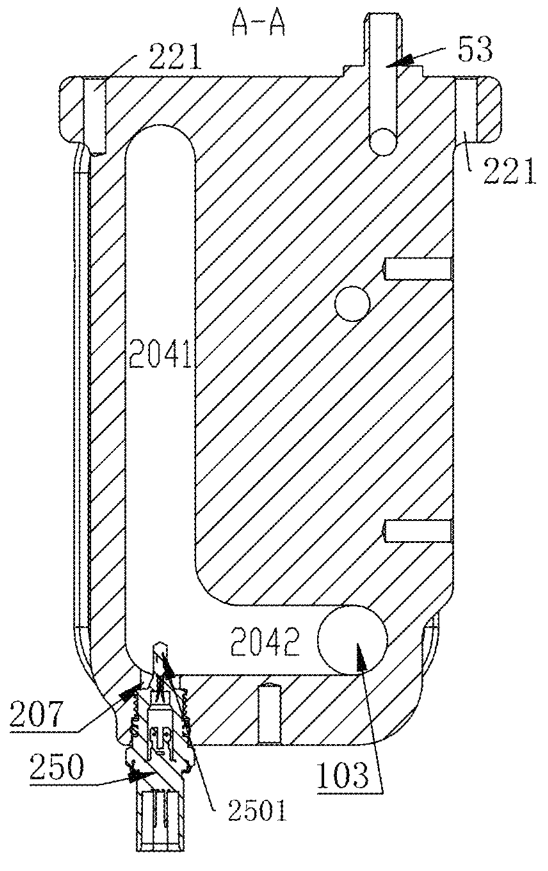
FIG. 4 is the schematic cross-sectional view of the throttle heat exchange assembly taken along A-A direction shown in FIG. 3.
Figure 5:
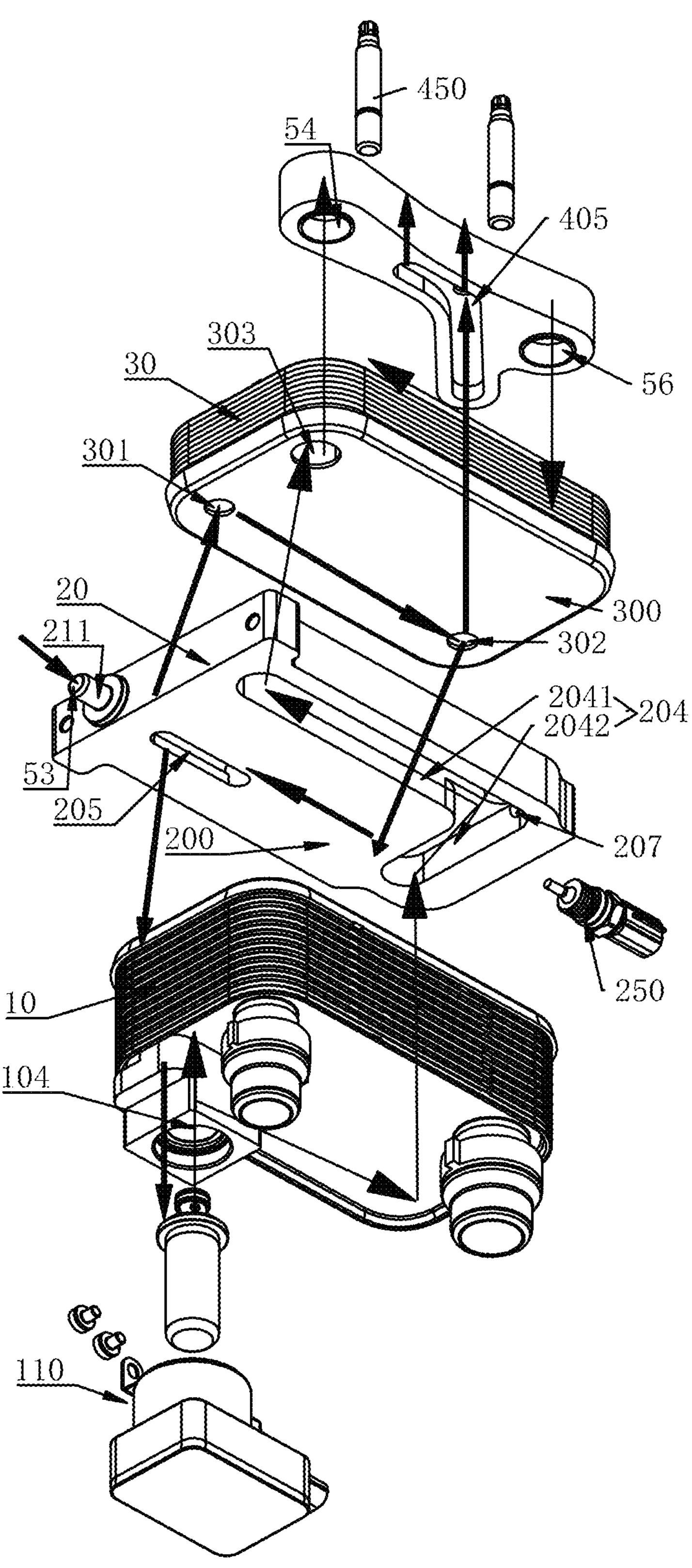
FIG. 5 is a schematic exploded view of the throttle heat exchange assembly.
Figure 6:
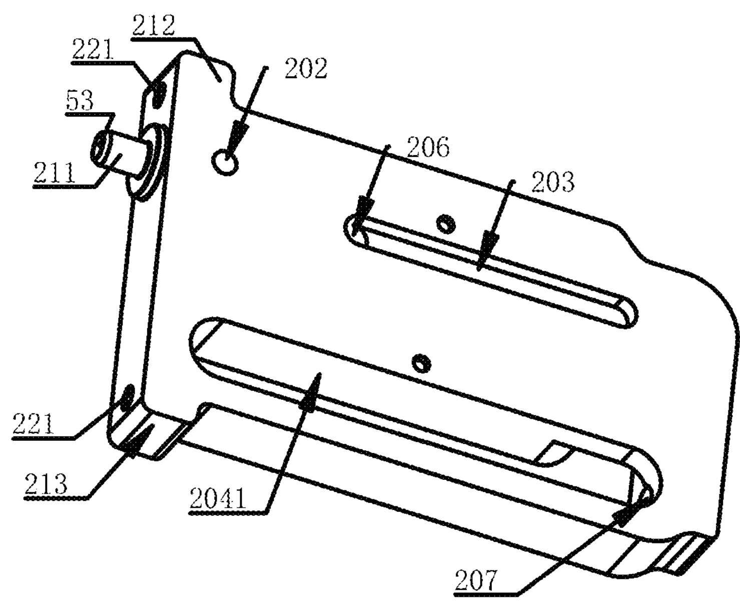
FIG. 6 is a schematic perspective view of a bridging member of the throttle heat exchange assembly.
Figure 7:
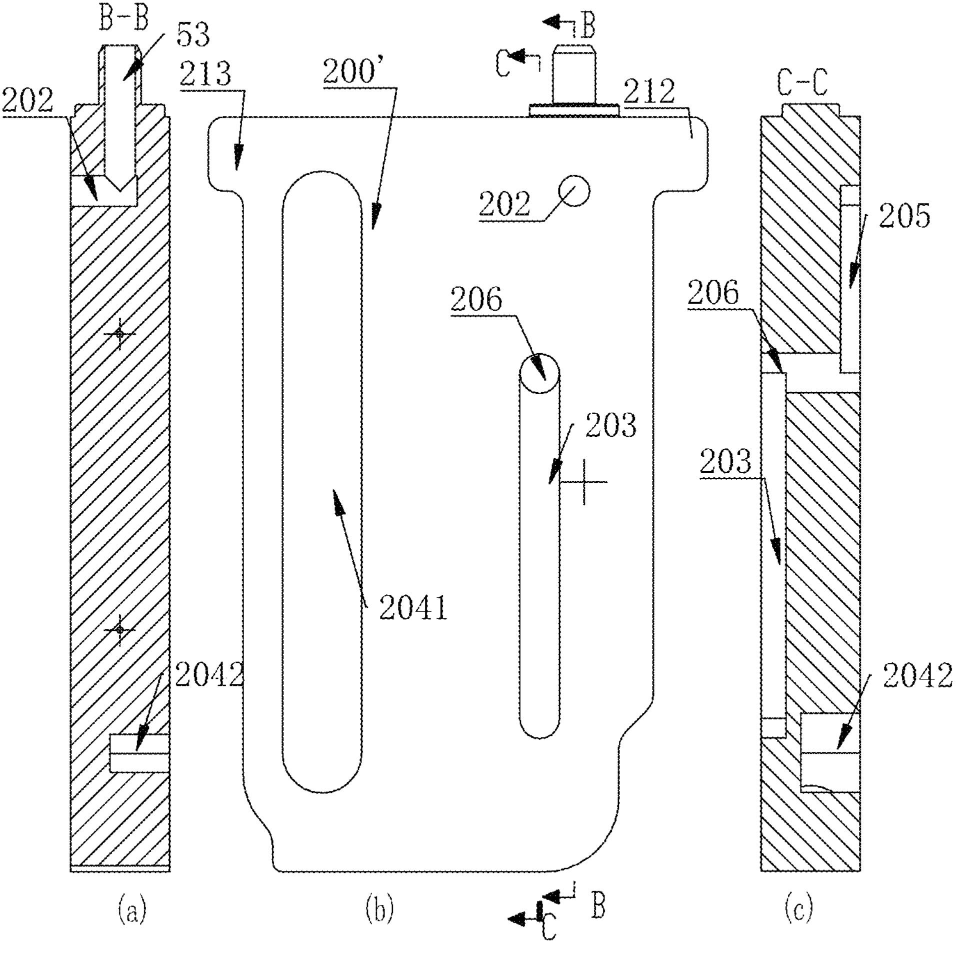
FIG. 7 is a schematic front view of the bridging member shown in FIG. 6 and schematic cross-sectional views of the bridging member shown in FIG. 6 taken along B-B direction and C-C direction.
Figure 8:
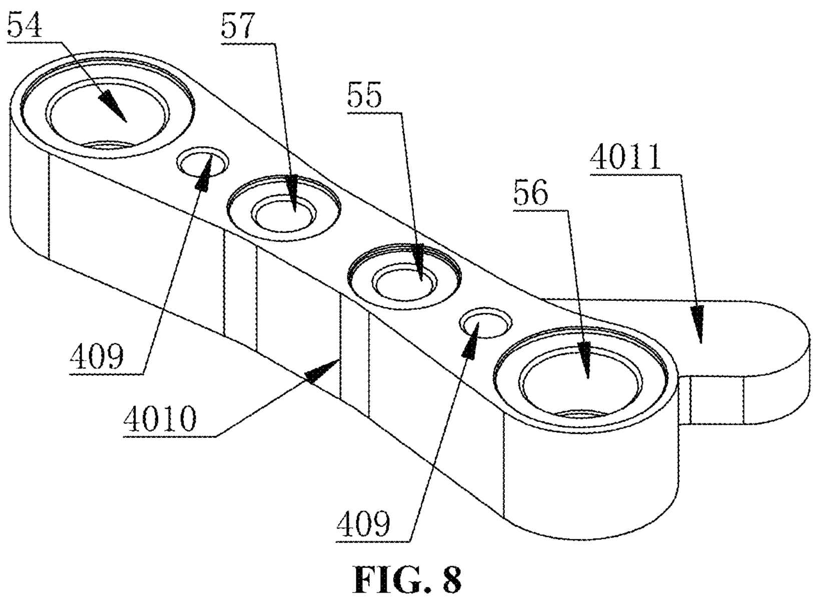
FIG. 8 and FIG. 9 are schematic perspective views of a connecting member of the throttle heat exchange assembly viewed in two directions.
Figure 9:
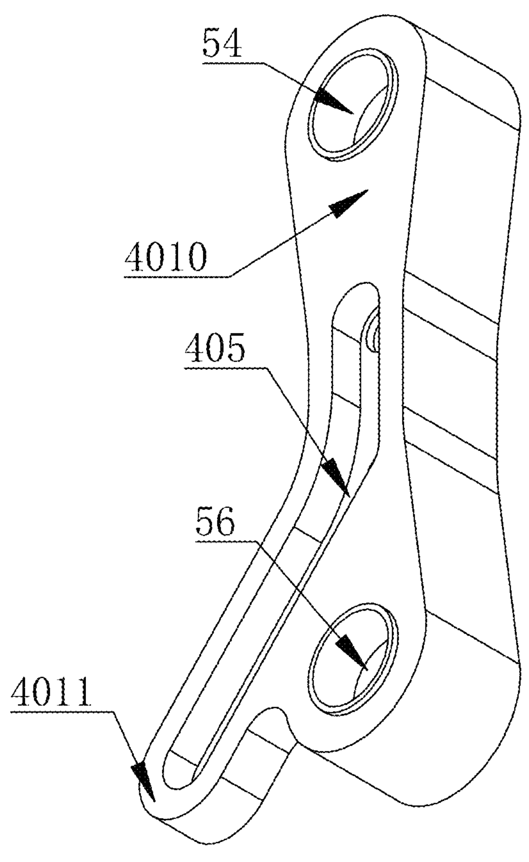

The technical solution is described below in conjunction with specific embodiments, as shown in FIG. 1 to FIG. 9, FIG. 1 and FIG. 2 are schematic perspective views of the first embodiment of the heat exchange assembly provided by the present disclosure in two directions, FIG. 3 is a schematic front view of the heat exchange assembly, FIG. 4 is the schematic sectional view of the assembly shown in FIG. 3 in A-A direction, FIG. 5 is an exploded schematic view of the heat exchange assembly, FIG. 6 is a perspective view of a bridging member of the heat exchange assembly, FIG. 7 is a front view of the bridging member shown in FIG. 6 and a schematic cross-sectional view of the bridging member along the B-B direction and the C-C direction, FIG. 8 and FIG. 9 are the three-dimensional schematic views of the connecting member of the heat exchange assembly in two directions. As shown in the figure, the heat exchange assembly includes a first heat exchange part 10, a throttle element 110, a bridging member 20, a second heat exchange part 30, and a connecting member 40. The bridging member 20 is located between the first heat exchange part 10 and the second heat exchange part 30, the connecting member 40 is located on the other side of the second heat exchange part 30. That is, the bridging member 20 and the connecting member 40 are respectively arranged on both sides of the second heat exchange part. The first heat exchange part 10, the bridging member 20 and the second heat exchange part 30 are fixed by welding, or the first heat exchange part 10, the bridging member 20, the second heat exchange part 30 and the connecting member are fixed by welding.

The first heat exchange part 10 has a heat exchange core body and two flow passages through which fluid flows for heat exchange, and the two fluid flow passages are separated from each other. The first heat exchange part 10 includes interlayer flow passages separated by stacks of plates. At least two fluids may flow through the first heat exchange part 10, the two fluids can exchange heat in the first heat exchange part, for example, one fluid is a refrigerant, and the other fluid may be a coolant for cooling heating elements such as batteries. In addition, the heat exchange part may also be used for three fluids to flow through. For example, one fluid is refrigerant, the other two fluids may be coolant. The two coolants may be controlled to selectively exchange heat with the refrigerant, and then the coolants can be used to cool the components to be cooled after heat exchange and temperature reduction. The following description is given by taking two fluids flowing through the first heat exchange part as an example.

The heat exchange assembly has a first port 51, a second port 52, a third port 53, a fourth port 54, a fifth port 55, a sixth port 56, and a seventh port 57. In this embodiment, the first heat exchanger is provided with a first port 51 and a second port 52. The bridging member 20 is provided with a third port 53. The connecting member 40 is provided with a fourth port 54, a fifth port 55, a sixth port 56, and a seventh port 57. The throttle element 110 and the first heat exchange part 10 are fixedly arranged or position limitedly arranged. The first heat exchange part 10 has four ducts such as a first duct 103 and a second duct 104 (not all shown in the figure). In the duct 104, the first heat exchange part is further provided with a pipe with a communication port 105, and the communication port 105 is in communication with the throttle element 110. The first heat exchange part 10 includes a first port part 101 and a second port part 102. The first port part 101 has a first port 51 for being in communication with the coolant. The second port part 102 has a second port 52 for being in communication with the coolant. The first port 51 is in communication with the second port 52 through a flow passage of the heat exchange core body, the first port 51 and the second port 52 may be a part of a side plate of the first heat exchange part, or may be separately processed and fixed to a side plate of the first heat exchange part and/or the heat exchange core body by welding, or the first port 51 and the second port 52 may be fixed to the first heat exchange part by pipe joints.

The bridging member 20 has a first matching part 200 and a second matching part 200'. Correspondingly, the first heat exchange part 10 has a matching part 100, which is correspondingly matched with the first matching part 200 of the bridging member. The second heat exchange part 30 has a matching part 300, which is correspondingly matched with the second matching part 200' of the bridging member; the matching part 100 of the first heat exchange part 10, the matching part 300 of the second heat exchange part 30, and the two matching parts of the bridging member are all provided with flat parts. The hole or groove for communication or the opening of the guide part of the bridging member provided on the side of the first matching part 200 is all located inside the first matching part. In addition, the periphery of each opening for communication is surrounded by the first matching part. The first heat exchange part has a corresponding opening for communication at a position corresponding to each opening of the bridging member for being in communication with. Each opening for communication of the first heat exchange part is located inside the matching part thereof, and each opening for communication is surrounded by the matching part. In this way, after the matching part 100 of the first heat exchange part 10 and the first matching part 200 of the bridging member are welded and sealed, the opening for communication of the bridging member can be in communication with the corresponding opening for communication of the first heat exchange part. In other words, the periphery of each opening for communication includes a part of the matching part. The two openings for communication form a substantially closed structure at the matching parts that are opposite arranged; the matching part 300 of the second heat exchange part 30 corresponds to the position of the second matching part 200' of the bridging member. After the second heat exchange part is welded and sealed with the bridging member, the openings for communication of the bridging member on this side are all in communication with the openings for communication of the second heat exchange part. Specifically, the second heat exchange part 30 has an opening with three ducts on the side opposite to the bridging member 20: for the third duct 301, the fourth duct 302, and the first duct 303, and the bridging member 20 has the opening of the guide hole 202, the opening of the first groove 203 and the opening of the hole 2041 of the guide part 204 on the side opposite to the second heat exchange part 30, that is, the second matching part. The opening of the third duct 301 of the second heat exchange part corresponds to the opening of the guide hole 202, the opening of the fourth duct 302 corresponds to the position of the opening of the first groove 203, the position of the opening of the first duct 303 corresponds to the position of the opening of the hole 2041 of the guide part 204. The opening of the hole 2041 is arranged to substantially extend upward and downward, and the opening of the first groove 203 is arranged to generally extend upward and downward.

The positional words herein such as upward and downward are for the purpose of clarification and should not be regarded as a limitation, which corresponds to a height direction accordingly. The hole herein includes but is not limited to through holes and blind holes. A shape of the hole may be circular or non-circular; the groove is a non-penetrating groove, but it also includes the case that most parts of the groove are penetrated with some parts not be.

The bridging member 20 further includes a third port part 211, and the third port part 211 has a third port 53. The third port part 211 includes an outwardly protruding structure. The third port part 211 may be a structure integrated with the main body of the bridging member, or may be a structure that is processed separately and fixed to the main body of the bridging member by welding. In addition, the bridging member 20 is provided with a through hole 206, and the first groove 203 is a blind hole-like structure extending upward and downward. A through hole 206 is provided on the side of the first groove 203 relatively close to the third port part; a second groove 205 is arranged on the side of the bridging member where the first matching part is located. The second groove 205 is a blind hole-like structure extending upward and downward. The through hole 206 is located on the side of the second groove 205 relatively far away from the third port part; the first groove 203 is in communication with the second groove 205 through the through hole 206. In other words, the through hole 206 or a part of the through hole 206 is extended at one end of the first groove 203, and the through hole 206 or another part of the through hole 206 is extended at one end of the second groove 205, as shown in FIG. 7. The guide hole 202 is a blind hole-like structure, the opening of the guide hole 202 is on the side of the second matching part, and the guide hole 202 is in communication with the third port 53. A depth of the guide hole is greater than or equal to a half thickness of the bridging member. Or the depth of the guide hole is nearly a half thickness of the bridging member. For example, the depth of the guide hole is greater than or equal to one-third of the thickness of the bridging member and less than two-thirds of the thickness of the bridging member. The guide part 204 includes a hole 2041 and a groove 2042. The hole 2041 is substantial a through hole, and the groove 2042 is substantial a blind hole. The opening of the groove 2042 is disposed on the side where the first matching part is located. In this specification, the side of the bridging member facing the first heat exchange part is defined as the front side, and the side of the bridging member facing the second heat exchange part is defined as the back side. In this embodiment, the side where the first groove 203 is set is the back side of the bridging member, and the side where the second groove 205 is set is the front side of the bridging member. A projection of the first groove 203 on the front side is at least partially located in the groove 2042 of the guide part. A projection of the guide hole 202 on the front side is at least partially located in the second groove 205. That is, the guide hole 202 is at least partially back to the second groove 205 and is not in direct communication. The first groove 203 is at least partially back to the groove 2042 and is not in direct communication.

The connecting member 40 includes a main body part 4010 and an extension part 4011. The connecting member 40 is provided with a fourth port 54, a fifth port 55, a sixth port 56, a seventh port 57, and is further provided with a fixing hole 409 for matching, fixing or position limiting. The connecting member 40 has a groove 405 on the side facing the second heat exchange part 30, and the groove 405 is substantial a blind hole-like structure. A seventh port 57 is provided at the groove 405 relatively close to the fourth port 54, and a fifth port 55 is provided at a substantially middle position of the groove 405. Both the fifth port 55 and the seventh port 57 are in communication with the groove 405. The connecting member may further include a fixing element 450 for fixing or position limiting. The fixing element 450 may be fixedly arranged or position limited arranged to the fixing hole 409.

The heat exchange assembly can facilitate the installation and connection of the thermal management system, reduce the number of connected pipes, and reduce the volume of the system. Taking the heat exchange assembly for a vehicle thermal management system as an example, it should be noted that the components of the heat exchange assembly are fixed in actual use. For the sake of clarity, the flow of the refrigerant is shown in the exploded view, which is only for clarity and explanation. A specific vehicle thermal management system includes a refrigerant system and a battery thermal management system. Referring to FIG. 5 and other views, the battery thermal management system includes a first port part 101, a second port part 102 of the heat exchange assembly, and a flow passage part in the first heat exchange part that is in communication with the first port and the second port. The heat of the battery can be transferred to the coolant, and the heat passes through the flow passage of the first heat exchange part through the first port 51 or the second port 52, and exchanges heat with the refrigerant of another flow passage in the first heat exchange part. After being cooled down, the coolant is flowing back to cool the battery. The third port 53, the fourth port 54, the fifth port 55, the sixth port 56, and the seventh port 57 are used to be in communicating with the refrigerant system, respectively. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant passes through the guide hole 202 to the third duct 301 of the second heat exchange part, and exchanges heat with the refrigerant of another flow passage in the second heat exchange part 30, then flows to the fourth duct 302. The refrigerant through the fourth duct 302 is divided into two parts: one part of the refrigerant flows through the flow passage formed by the space where the groove 405 is located and by cooperation of the connecting member 40 and the second heat exchange part, and then flows out through the fifth port 55 and the seventh port 57, for example, to the front evaporator through the fifth port 55 and to the rear evaporator through the seventh port 57, or to the rear evaporator through the fifth port 55 and to the front evaporator through the seventh port 57. A throttle element may also be set before the front evaporator or the rear evaporator. The other part of the refrigerant enters the throttle element 110 in the following sequence: a flow passage formed by the space where the first groove 203 is located and by cooperation of the bridging member and the matching part of the second heat exchange part; a through hole 206; a flow passage formed by the space where the second groove 205 is located and by cooperation of the bridging member and the matching part of the first heat exchange part; and a communication port in communication with the throttle element. After being throttled by the throttle element 110, this other part of refrigerant enters the duct of the first heat exchange part 10 and exchanges heat with the coolant in the coolant passage of the first heat exchange part in the refrigerant passage, and then flows to the first duct 103, and passes through the flow passage formed by the guide part 204 and cooperated with the bridging member, the first heat exchange part and the second heat exchange part, and flows to the first duct 303 of the second heat exchange part, and finally flows out through the fourth port in communication with the first duct 303, and, for example, flows back the compressor. In addition, the sixth port 56 can be used to be in communication with the refrigerant flowing back from the front evaporator and/or the rear evaporator. The low-temperature refrigerant flows to the first duct 303 through the second duct 304 of the second heat exchange part, and exchanges heat with the high-temperature refrigerant flowing from the third duct 301 to the fourth duct 302. In the first duct 303, the two parts of the refrigerant may flow back to the compressor through the fourth port after being merged. In this way, part of the low-temperature refrigerant is used to cool the high-temperature refrigerant, which can reduce the condensing temperature of the refrigerant without increasing the temperature of the refrigerant back to the compressor. The flow direction in this specification is only for illustration, not for restriction or excluded requirement, and other components can be added in the flow path, such as adding other control valves before the compressor. A second mounting part 207 is further provided on the bridging member 20 for mounting the sensing element 250, for example, the temperature sensing element, and thus the temperature sensing head 2501 is mounted to pass through the mounting part and is located in the flow passage where the guide part 204 is located. In this way, the temperature of the refrigerant after passing through the first heat exchange part or the outlet temperature of the evaporator can be obtained.

Figure 10:
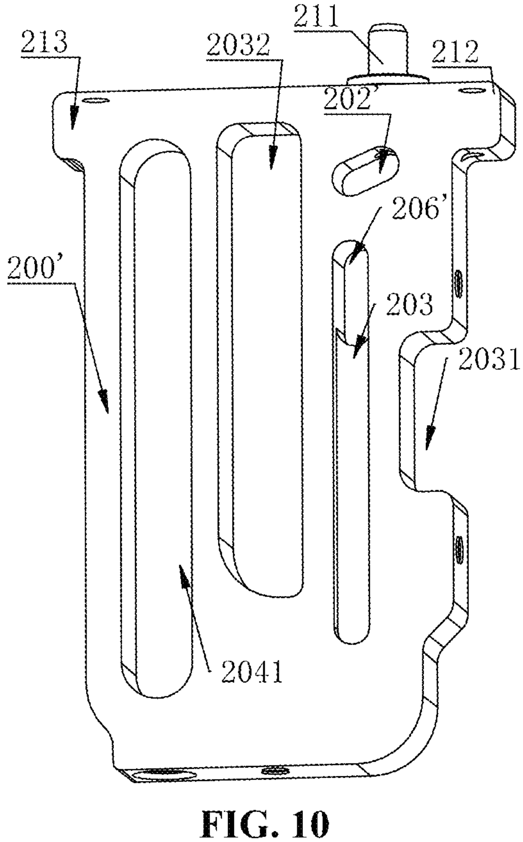
FIG. 10 and FIG. 11 are schematic perspective views of another embodiment of the bridging member of the above throttle heat exchange assembly.
Figure 11:
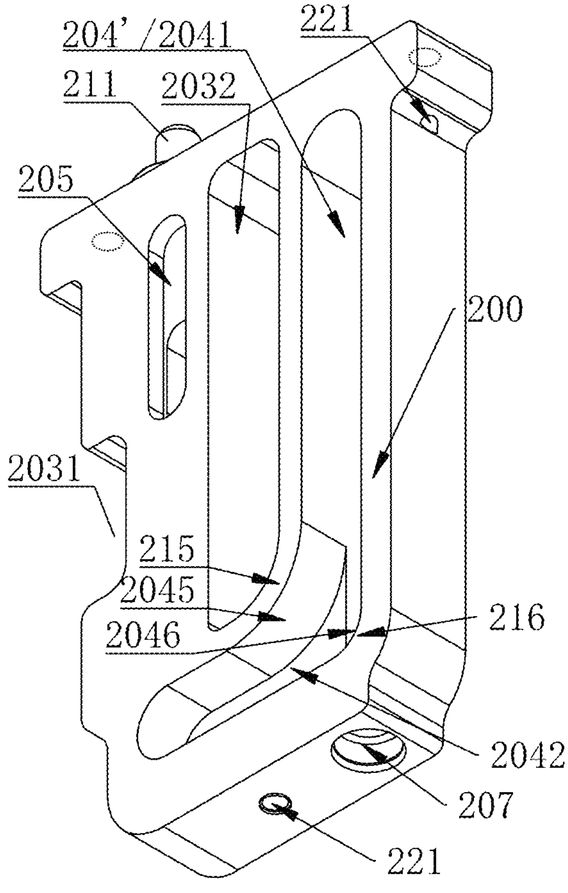

The heat exchange assembly can realize heat exchange between high-temperature refrigerant and part of low-temperature refrigerant, reduce the temperature of the high-temperature refrigerant, and prevent the temperature of the refrigerant back to the compressor from being too high, thereby improving the efficiency. In addition, the pipelines can be reduced between the ports, and the system connection is simple and convenient. In addition, in order to further reduce the weight, the bridging member may also be as shown in FIG. 10 and FIG. 11, which is improved based on the above embodiment, and a piece is removed in the middle of the bridging member to form a hole 2032. The shape of the hole 2032 may be non-standard and may be changed according to the needs of welding. The hole is a through hole. The distance between the through hole 2032 and the second groove 205 of the bridging member facing the first heat exchange part for communication is greater than or equal to 1.5 mm. The distance between the through hole 2032 and the guide part 204 of the bridging member facing the first heat exchange part for communication is greater than or equal to 1.5 mm; the distance between the through hole 2032 and the hole 202' of the bridging member facing the second heat exchange part for communication is greater than or equal to 1.5 mm, and the hole 202' is a guide hole. The distance between the through hole 2032 and the first groove 203 of the bridging member facing the second heat exchange part for communication is greater than or equal to 1.5 mm. The distance between the through hole 2032 and the hole 2041 for communication facing the second heat exchange part of the bridging member is greater than or equal to 1.5 mm. In other words, this distance is the distance between the matching parts of the bridging members used to cooperate with the first heat exchange part and the second heat exchange part respectively, and the matching parts are used for welding. However, the hole for weight-reducing has not to be configured as a through hole, for example, both sides of the bridging member can be concaved so as to form blind holes or grooves, which can also reduce weight and facilitate of welding, the through hole is selected just for convenient processing. In addition, a piece is removed at one side of the bridging member to form a concave part, namely a notch 2031. In this way, the area of the first matching part of the bridging member for matching with the first heat exchange part can be reduced, and the area of the second matching part of the bridging member for matching with the second heat exchange part can also be reduced. Therefore, the welding area of the matching parts can be reduced, which is helpful to improve the welding quality, and reduce the weight. At the intersection of the hole 2041 and the groove 2042, the bridging member has a first wall 215 and a second wall 216. A surface of the first wall 215 facing the guide part forms a first wall surface 2045 with a smooth transition. A surface of the second wall 216 facing the guide part forms a second wall surface 2046 with a smooth transition. For the flow passage formed by the guide part 204' and cooperated with the bridging member, the first heat exchange part and the second heat exchange part, the flow resistance of the refrigerant during turning can be reduced with the configuration of this smooth transition part. The non-circular guide hole 202' is slightly lateral extended, which facilitates of being cooperated with the flowing of refrigerant.

Figure 12:
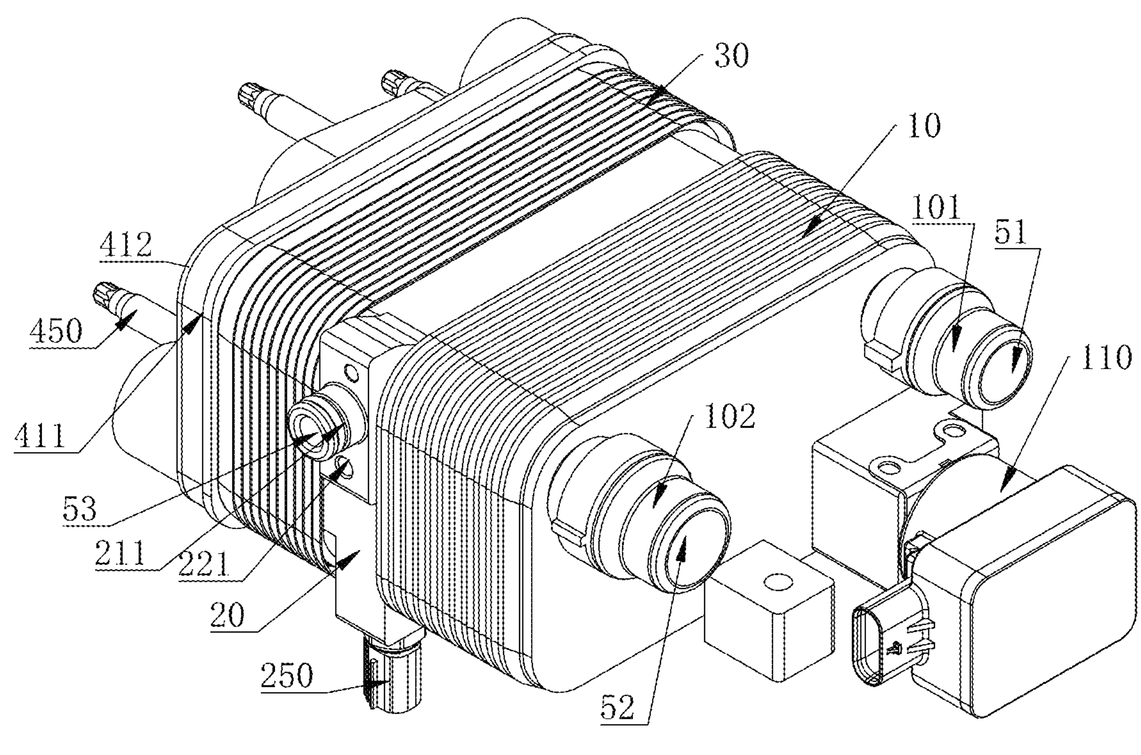
FIG. 12 and FIG. 13 are schematic perspective views of the second embodiment of the heat exchange assembly in two directions.
Figure 13:
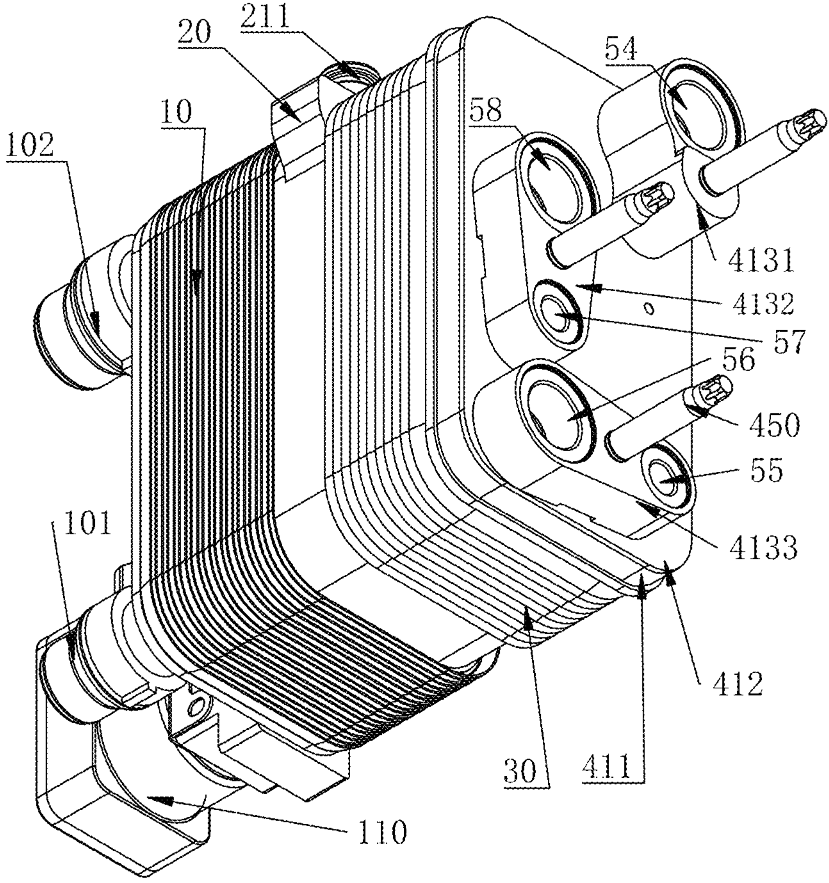
Figure 14:
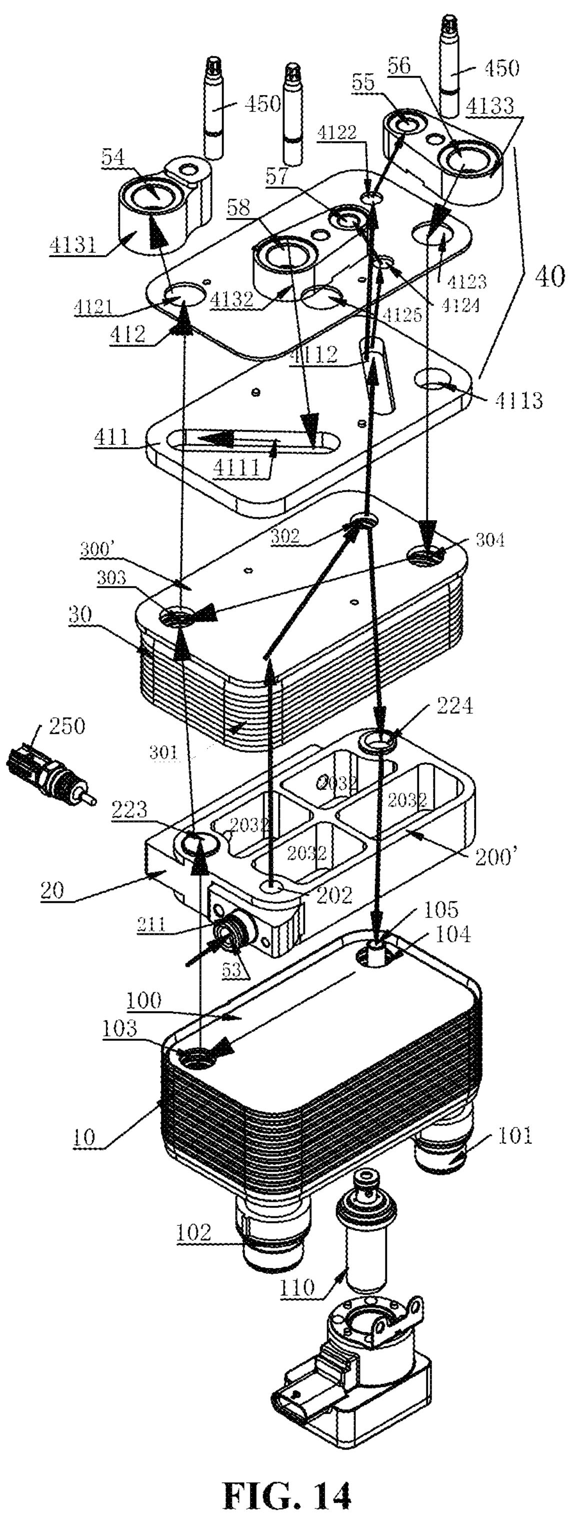
FIG. 14 is an exploded schematic view of the heat exchange assembly shown in FIG. 12.
Figure 15:
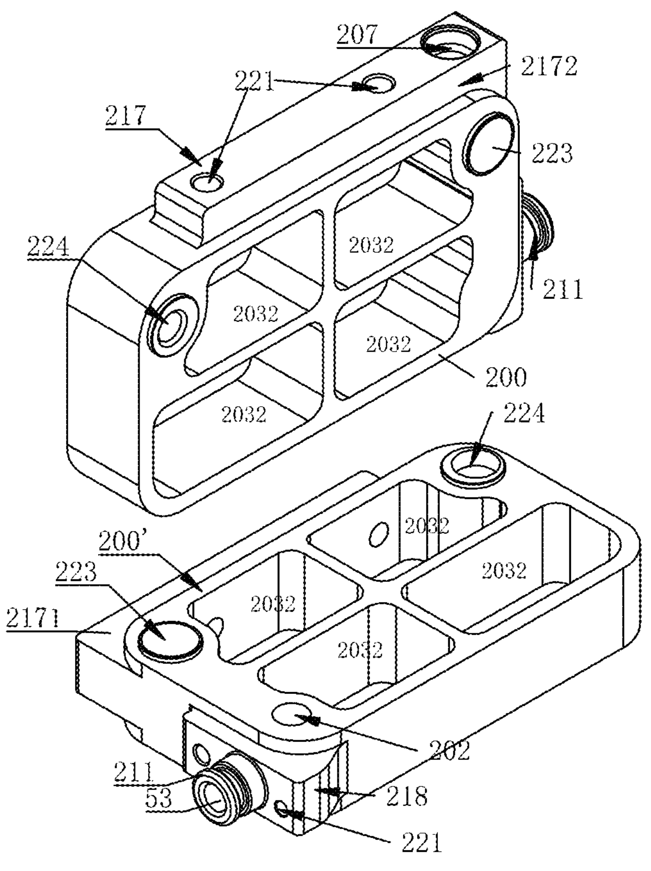
FIG. 15 is a perspective view of the bridging member of the heat exchange assembly shown in FIG. 12 in two directions.
Figure 16:
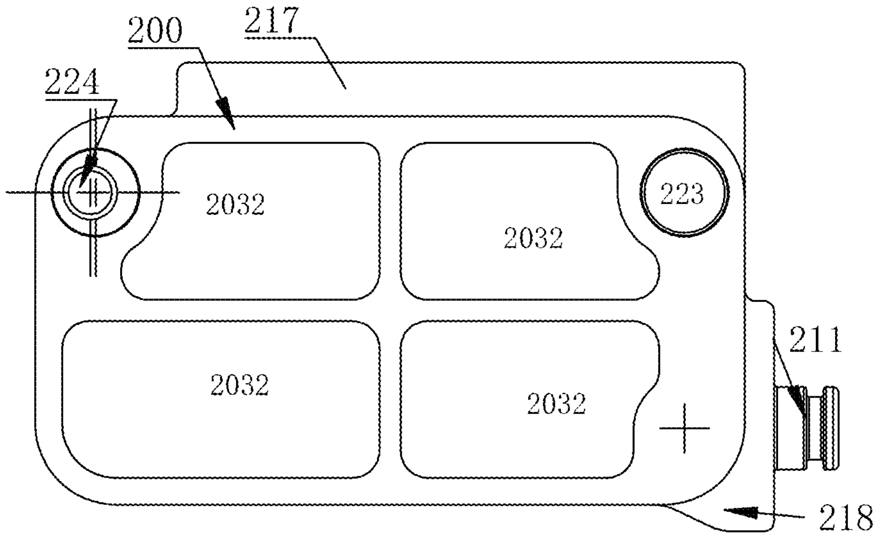
FIG. 16 is a schematic front view of the bridging member shown in FIG. 15.
Figure 17:
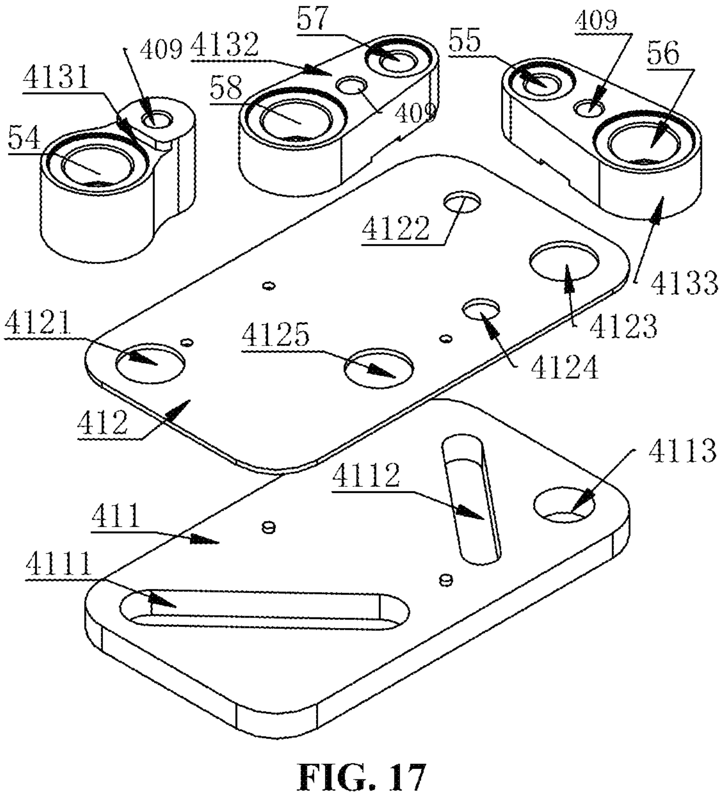
FIG. 17 is an exploded schematic view of the connecting member of the heat exchange assembly shown in FIG. 12.
Figure 18:
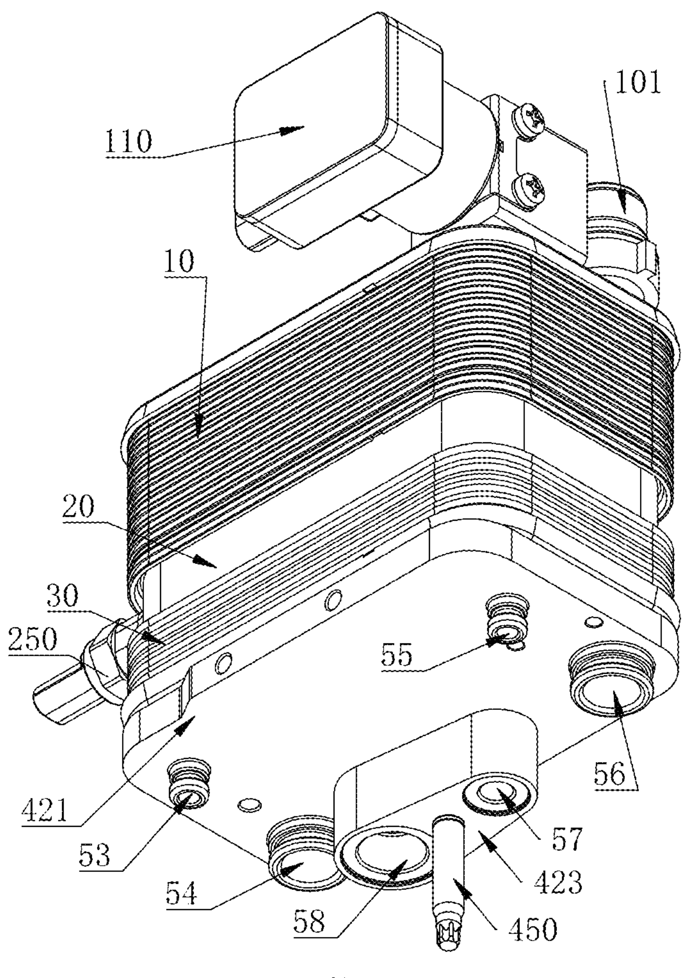
FIG. 18 and FIG. 19 are schematic perspective views of the third embodiment of the heat exchange assembly in two directions.
Figure 19:
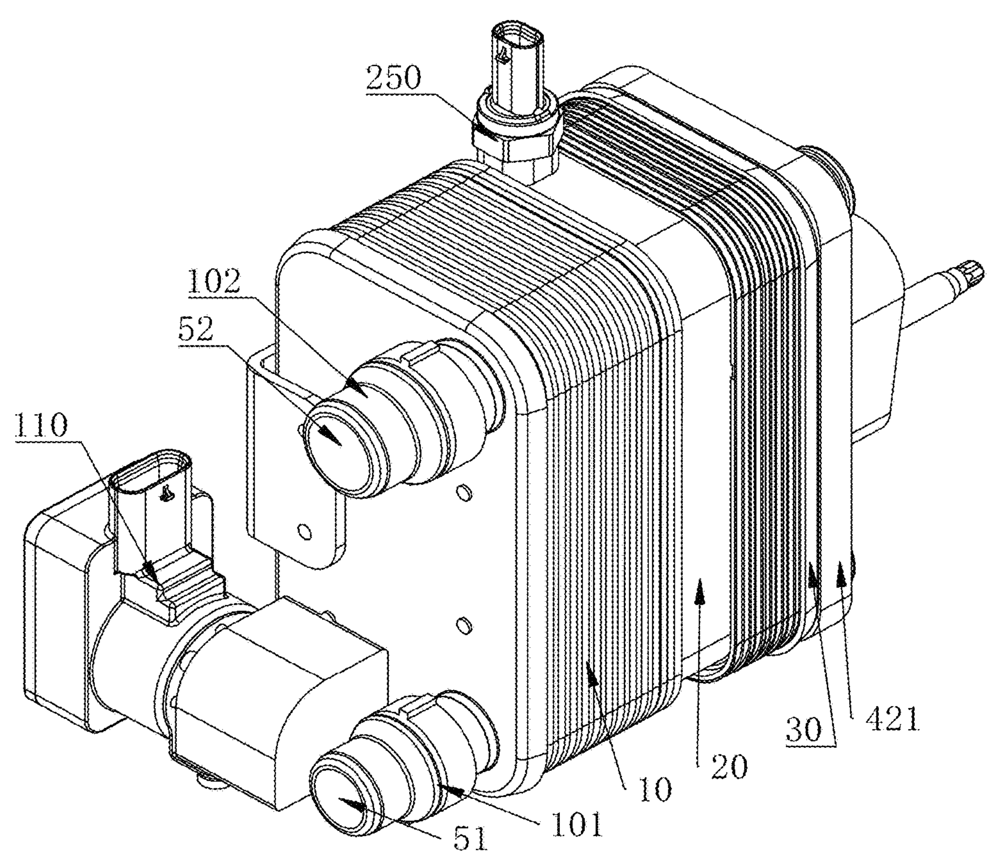

The second embodiment of the heat exchange assembly is described below, referring to FIG. 12 to FIG. 17, where FIG. 12 and FIG. 13 are schematic perspective views of the heat exchange assembly in two directions, FIG. 14 is an exploded schematic view of the heat exchange assembly, FIG. 15 is a schematic perspective view of the bridging member of the heat exchange assembly in two directions, FIG. 16 is a schematic front view of the bridging member shown in FIG. 15, FIG. 17 is an exploded schematic view of the connecting member of the heat exchange assembly shown in FIG. 12. The heat exchange assembly includes a first heat exchange part 10, a bridging member 20, a second heat exchange part 30 and a connecting member. The heat exchange assembly has a first port 51, a second port 52, a third port 53, a fourth port 54, a fifth port 55, a sixth port 56, a seventh port 57 and an eighth port 58. The bridging member 20 is provided with a third port part 211. The throttle element 110 and the first heat exchange part 10 are fixedly arranged or position limitedly arranged. The first heat exchange part 10 has four ducts such as a first duct 103 and a second duct 104 (not all shown in the figure). The first heat exchange part 10 includes a first port part 101 and a second port part 102. The first port part 101 has a first port 51 in communication with the coolant. The second port part 102 has a second port 52 in communication with the coolant. The first port 51 is in communication with the second port 52 through the flow passage of the heat exchange core body. The first port part 101 and the second port part 102 may be a part of the side plate of the first heat exchange part, or these two port parts may be processed separately and fixed to the side plate and/or the heat exchange core body of the first heat exchange part by welding.

The bridging member 20 has a first matching part 200. The first heat exchange part 10 has a matching part 100 which is matched with the first matching part 200 of the bridging member. The first matching part 200 is opposite to and matched with the matching part of the first heat exchange part. The matching part 100 of the first heat exchange part 10 and the first matching part 200 of the bridging member both include a flat part. A hole or a groove for communication or openings of a guide part of the bridging member, which are provided at the side of the first matching part 200, are all arranged inside the first matching part. In addition, the periphery of each communication opening is surrounded by the first matching part. The first heat exchange part has a corresponding communication opening at a position corresponding to each communication opening of the bridging member. Each communication opening is located inside the matching part thereof, and each communication opening is surrounded by the matching part; in other words, the two communication openings both include substantially closed structures at the oppositely arranged matching parts. In this way, after the matching part 100 of the first heat exchange part 10 and the first matching part 200 of the bridging member are welded and sealed, the communication opening of the bridging member is in communication with the corresponding communication opening of the first heat exchange part. Specifically, the first heat exchange part 10 has the opening of the first duct 103 and the communication port 105 of the pipeline in communication with the throttle element on the side opposite to the bridging member 20. The first heat exchange part 10 has the opening of the first duct 103 and the communication port 105 in communication with the throttle element on the side opposite to the bridging member 20. The bridging member 20 has corresponding holes 223 and 224 on the side opposite to the first heat exchange part 10. The opening of the hole 223 corresponds to the position of the opening of the first duct 103 of the first heat exchange part. The opening of the hole 224 corresponds to the communication port 105 in communication with the throttle element. The holes 223 and 224 are through holes.

The bridging member 20 has a second matching part 200', and the second matching part 200' faces the second heat exchange part. The second heat exchange part 30 has a matching part 300. Both the matching part 300 of the second heat exchange part 30 and the second matching part 200' of the bridging member include a flat part. A hole or a groove for communication or openings of a guide part of the bridging member, which are provided at the side of the second matching part, are all arranged inside the second matching part. In addition, the periphery of each communication opening is surrounded by the second matching part. The second heat exchange part has a corresponding communication opening at a position corresponding to each communication opening of the bridging member. Each communication opening is located inside the matching part thereof, and the periphery of each communication opening is surrounded by the matching part; in other words, the periphery of each communication opening includes a part of the matching part. The two communication openings form a substantially closed structure at the matching parts that are opposite arranged; the matching part 300 of the second heat exchange part 30 corresponds to the position of the second matching part 200' of the bridging member. After the second heat exchange part is welded and sealed with the bridging member, the communication openings of the bridging member on this side can be in communication with the communication openings of the second heat exchange part. Specifically, the second heat exchange part 30 has the openings of three ducts on the side opposite to the bridging member 20: the openings of the third duct 301, the fourth duct 302, and the first duct 303, and the bridging member 20 has the opening of the guide hole 202, the opening of the hole 223 and the opening of the hole 224 on the side opposite to the second heat exchange part 30, that is, the second matching part. The opening of the third duct 301 of the second heat exchange part corresponds to the opening of the guide hole 202, the opening of the fourth duct 302 corresponds to the position of the opening of the hole 224. The opening of the first duct 303 corresponds to the position of the opening of the hole 223. The bridging member 20 further includes a third port part 211, and the third port part 211 has a third port 53. The third port part 211 includes an outwardly protruding structure. The third port part 211 may be a structure integrated with the main body of the bridging member, or may be a structure that is processed separately and fixed to the main body of the bridging member by welding. The bridging member 20 is provided with four holes 2032, and the holes 2032 are non-circular through holes, and may also be circular. The guide hole 202 is substantial a blind hole, the opening of the guide hole 202 is on the side where the second matching part is located, and the guide hole 202 is in communication with the third port 53. The bridging member further includes a convex part 217 and a second convex part 218. The convex part 217 protrudes substantially laterally along the main body part. The second convex part 218 is generally protruded outward from a corner of the main body part. A first side surface 2171 of the convex part 217 is lower than the second matching part 200' of the bridging member. A second side surface 2172 of the convex part 217 is lower than the first matching part 200 of the bridging member. Also, two side surfaces of the second convex part are correspondingly lower than the matching parts on the corresponding sides of the bridging member; in other words, the thickness of the convex part 217 and the thickness of the second convex part 218 are both less than the thickness of the main body of the bridging member. By providing the convex part and the second convex part, the size of the main body of the bridging member can be reduced, so that the fixing hole 221 can be at least partially arranged in the convex part 217 and/or the second convex part 218. In addition, at least part of the third port part 211 is located in the second convex part, thereby reducing the size of the main body of the bridging member.

The connecting member includes a connecting block 411, a connecting plate 412, a first connecting pipe matching part 4131, a second connecting pipe matching part 4132, and a third connecting pipe matching part 4133. The connecting block 411, the connecting plate 412, the first connecting pipe matching part 4131, the second connecting pipe matching part 4132, and the third connecting pipe matching part 4133 can be fixed by welding. A thickness of the connecting block 411 is greater than a thickness of the connecting plate 412. The first connecting pipe matching part 4131 is provided with a fourth port 54. The second connecting pipe matching part 4132 is provided with a seventh port 57 and an eighth port 58. The third connecting pipe matching part 4133 is provided with a fifth port 55 and a sixth port 56. The three connecting pipe matching parts of the connecting member are further provided with fixing holes 409, which are used for fixing or position limiting with the fixing element 450. The connecting plate 412 is located between the connecting block 411 and the three connecting pipe matching parts. The connecting block is relatively close to the second heat exchange part, in other words, the connecting block is abutted against the second heat exchange part and fixed by welding. The connecting block 411 has three through holes: a through hole 4111, a through hole 4112, and a through hole 4113. The through hole 4111 and the through hole 4112 are non-circular and can be arranged obliquely or arc-shaped, and the shape of which is not limited as long as the positions of the two ends of the through hole 4111 and the through hole 4112 can guide the corresponding flow passages, the through hole 4113 is circular; one side of the through hole 4111, one side of the through hole 4112 and the through hole 4113 are located on one side of the connecting block relatively close to the length direction. The connecting plate has five through holes: 4121, 4122, 4123, 4124, and 4125. The positions of the through-hole 4121 and the through-hole 4125 correspond to the through-hole 4111, that is, both the through-hole 4121 and the through-hole 4125 can be in communication with the through-hole 4111; the positions of the through hole 4122 and the through hole 4124 respectively correspond to the through hole 4112, that is, both the through hole 4122 and the through hole 4124 can be in communication with the through hole 4112. The position of the through hole 4123 corresponds to the through hole 4113; the position of the fourth port 54 corresponds to the through hole 4121. The fourth port can be in communication with the through hole 4121, that is, in communication with the through hole 4111 of the connecting block; the position of the eighth port 58 corresponds to the through hole 4125, the eighth port can be in communication with the through hole 4125, that is, in communication with the through hole 4111 of the connecting block; the position of the seventh port 57 corresponds to the through hole 4124. The seventh port can be in communication with the through hole 4124, that is, in communication with the through hole 4112 of the connecting block; the position of the fifth port 55 corresponds to the through hole 4122, the fifth port can be in communication with the through hole 4122, that is, in communication with the through hole 4112 of the connecting block; the position of the sixth port 56 corresponds to the through hole 4123. The sixth port can be in communication with the through hole 4123, that is, in communication with the through hole 4113 of the connecting block. In this embodiment, the connecting member may be processed by a profile or a stamping piece and formed by assembling, which can reduce the steps of machining.

The heat exchange assembly can facilitate the installation and connection of the thermal management system, reduce the number of connected pipes and connecting ports, and reduce the volume of the system. Taking the heat exchange assembly for a vehicle thermal management system as an example, it should be noted that these components are fixed in actual use. For the sake of clarity, the flow of the refrigerant is shown in the exploded view, which is only for clarity and explanation, referring to FIG. 14 and other views. Taking a vehicle thermal management system as an example, which includes a refrigerant system and a battery thermal management system, the battery thermal management system includes a first port part 101 and a second port part 102 of the heat exchange assembly, and a flow passage part in the first heat exchange part in communication with the first port and the second port. The heat of the battery can be transferred to the coolant, which flows through part of the flow passage of the first heat exchange part through the first port 51 or the second port 52, and exchanges heat with the refrigerant of another flow passage of the first heat exchange part. After being cooled down, the coolant flows back so as to cool the battery. The third port 53, the fourth port 54, the fifth port 55, the sixth port 56, the seventh port 57 and the eighth port 58 are used to be in communication with the refrigerant system, respectively. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant flows to the third duct 301 of the second heat exchange part through the guide hole 202 and exchanges heat with the refrigerant of another flow passage in the second heat exchange part 30, then flows to the fourth duct 302. The refrigerant to the fourth duct 302 is divided into two parts: a part of the refrigerant flows through the connecting member and the flow passage formed by the second heat exchange part, such as the through hole 4112 of the connecting block 411 and the through hole 4124 of the connecting plate and then flows to the seventh port 57, as well as flows through the through hole 4112 of the connecting block 411 of the connecting member, the through hole 4122 of the connecting plate and then flows to the fifth port 55, and then flows out through the fifth port 55 and the seventh port 57, for example, this part of refrigerant flows to the front evaporator through the fifth port 55, and flows to the rear evaporator through the seventh port 57, or this part of refrigerant flows to the rear evaporator through the fifth port 55, and flows to the front evaporator through the seventh port 57, where a throttle element may also be set before the front evaporator or the rear evaporator; the other part of the refrigerant enters the throttle element 110 through the through hole 224 of the bridging member and through the pipe communication port 105 in communication with the throttle element 110. The bridging member is not in communication with the second duct 104. After being throttled by the throttle element 110, the refrigerant enters the second duct 104 of the first heat exchange part 10, exchanges heat with the coolant in the coolant passage of the first heat exchange part, and flows to the first duct 103. Then the refrigerant passes through the through hole 223 of the bridging member to the first duct 303 of the second heat exchange part, and flows out through the through hole 411 of the connecting block, the through hole 4121 of the connecting plate and the fourth port 54, and for example flows back to the compressor. In addition, the sixth port 56 may be used to be in communicating with the refrigerant flowing back from the front evaporator and/or the rear evaporator. This part of the low-temperature refrigerant passes through the through hole 4123 of the connecting plate and the through hole 4113 of the connecting block to the second duct 304 of the second heat exchange part, then the refrigerant flows to the first duct 303, and exchanges heat with the high-temperature refrigerant flowing from the third duct 301 to the fourth duct 302. In the first duct 303, these two parts of the refrigerant can flow back to the compressor through the fourth port after being merged; the eighth port 58 may be used to in communication with the refrigerant flowing back from the rear evaporator and/or the front evaporator, this part of the low-temperature refrigerant passes through the through hole 4125 of the connecting plate and the through hole 4111 of the connecting block, and converges with the rest of the refrigerant to flow back to the compressor through the fourth port. The flow direction in this specification is only for illustration, not for restriction or as an excluded requirement, and other components can be added therein, such as adding other control valves before the compressor. The—19—ridging member 20 is provided with a second mounting part 207 for mounting the sensing element 250, such as a temperature sensing element. The hole of the second mounting part 207 can be in communication with the through hole 223, so that the sensor head 2501 for temperature sensing passes through the mounting part and is located in the flow passage where the through hole 223 is located. In this way, the temperature of the refrigerant after passing through the first heat exchange part or the outlet temperature of the evaporator can be obtained.

Figure 20:
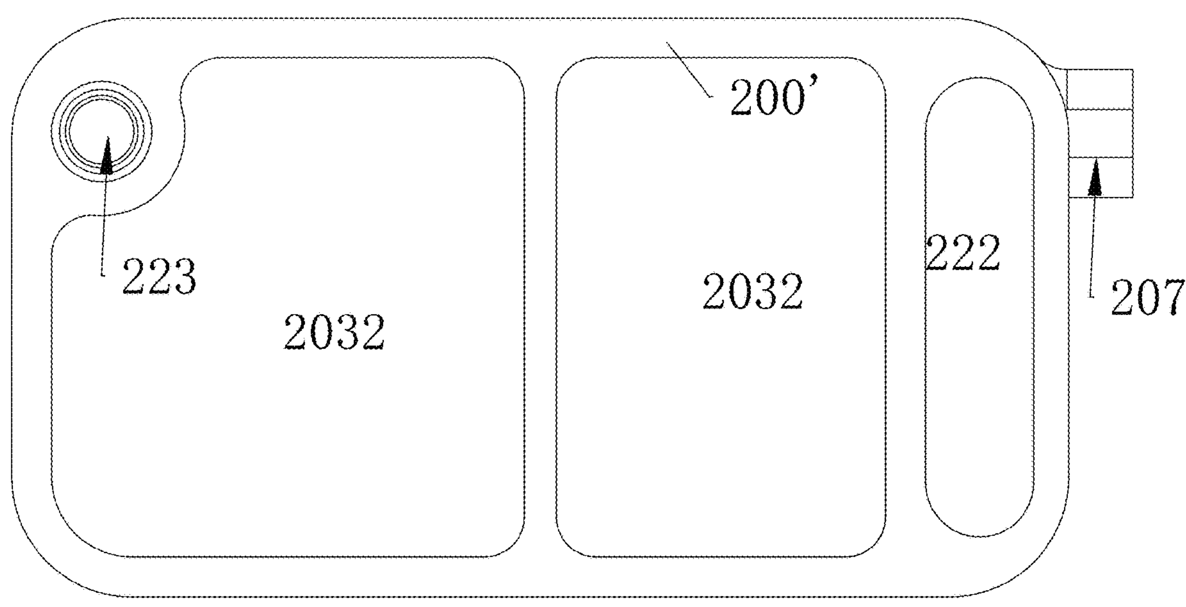
FIG. 20 is a schematic view of the bridging member of the heat exchange assembly shown in FIG. 18 and FIG. 19.
Figure 21:
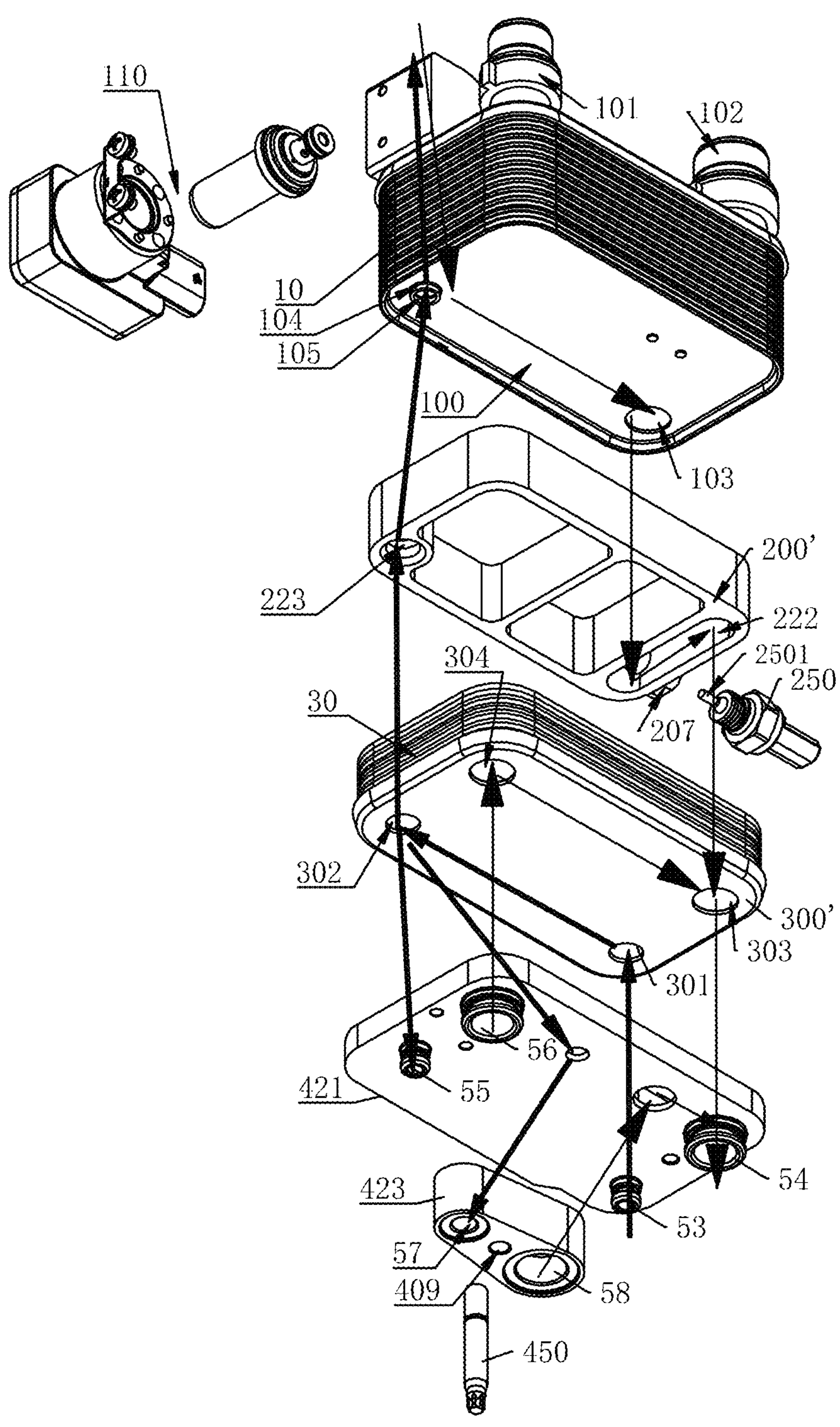
FIG. 21 is an exploded schematic view of the heat exchange assembly shown in FIG. 18 and FIG. 19.
Figure 22:
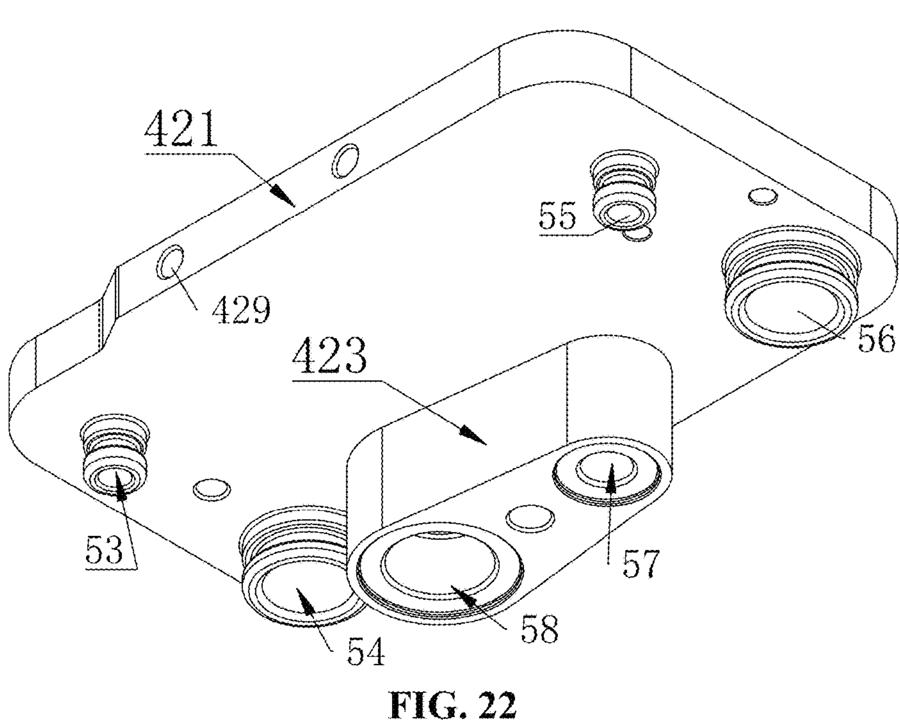
FIG. 22 is a perspective view of the connecting member of the heat exchange assembly shown in FIG. 18 and FIG. 19.
Figure 23:
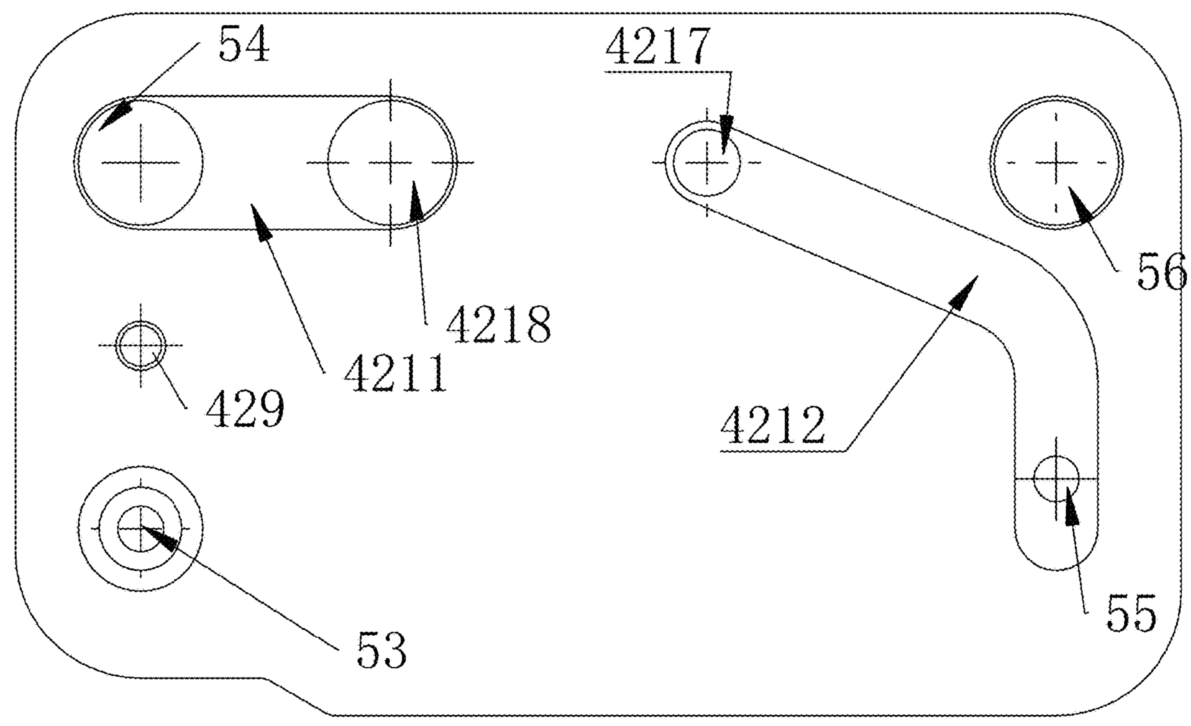
FIG. 23 and FIG. 24 are schematic views of a connecting block of the connecting member shown in FIG. 22 viewed in two front and rear directions.
Figure 24:
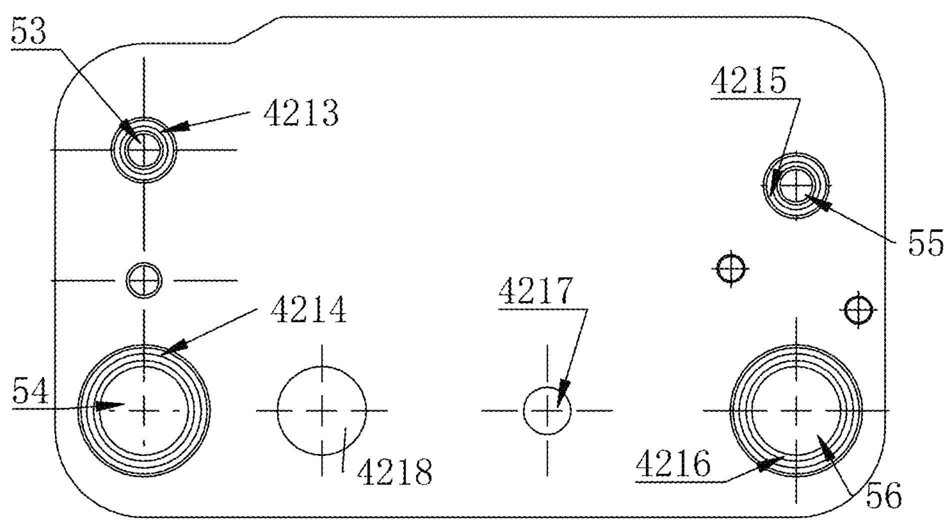
Figure 25:
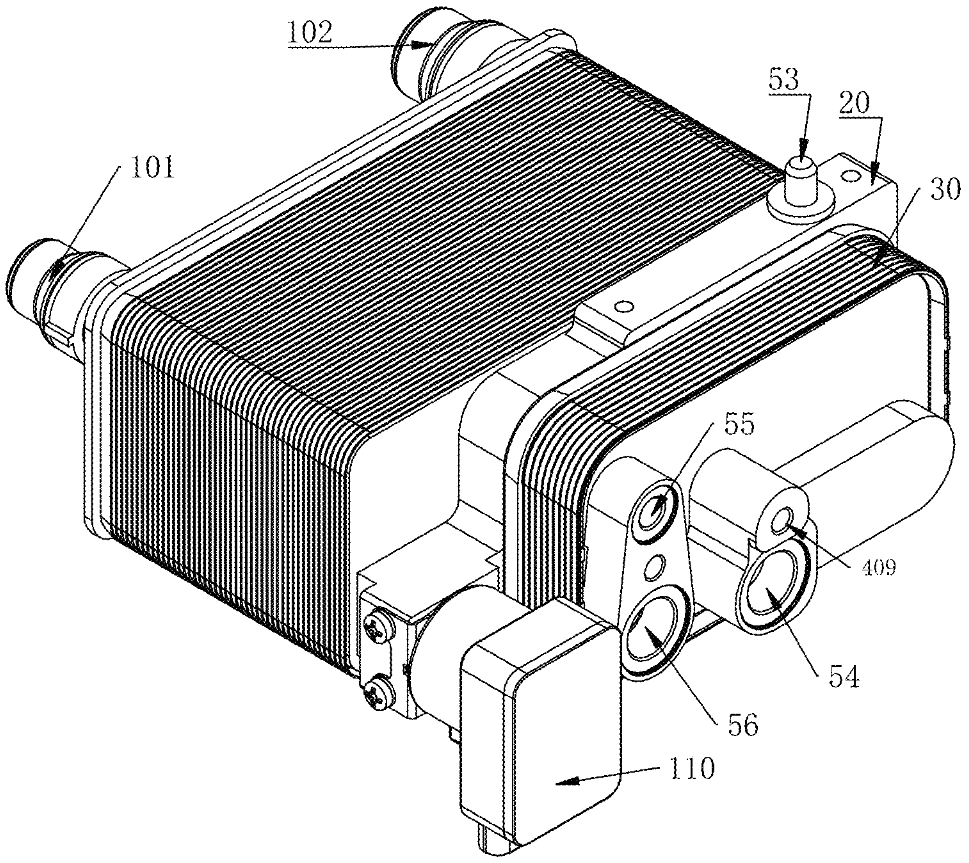
FIG. 25 is a schematic perspective view of the fourth embodiment of the heat exchange assembly.

The third embodiment of the heat exchange assembly is described below, referring to FIG. 18 to FIG. 24, FIG. 18 and FIG. 19 are schematic perspective views of the heat exchange assembly in two directions, FIG. 20 is a schematic view of the bridging member of the solution, FIG. 21 is an exploded schematic view of the heat exchange assembly, FIG. 22 is a perspective view of the connecting member of the heat exchange assembly, FIG. 23 and FIG. 24 are schematic views of the connecting block of the connecting member shown in FIG. 22 in the forward and reverse directions.

The heat exchange assembly includes a first heat exchange part 10, a bridging member 20, a second heat exchange part 30 and a connecting member. The heat exchange assembly has a first port 51, a second port 52, a third port 53, a fourth port 54, a fifth port 55, a sixth port 56, a seventh port 57 and an eighth port 58. A throttle element 110 and the first heat exchange part 10 are fixedly arranged or position limitedly arranged. The first heat exchange part 10 has four ducts, such as a first duct 103 and a second duct 104 (the remaining two ducts are not shown in the figure). The first heat exchange part 10 includes a first port part 101 and a second port part 102. The first port part 101 has the first port 51 in communication with the coolant. The second port part 102 has the second port 52 in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding.

The bridging member 20 has a first matching part 200 and a second matching part 200'. Accordingly, the first matching part 200 is opposite to and matched with the matching part 100 of the first heat exchange part 10. The second matching part 200' is opposite to and matched with the matching part 300 of the second heat exchange part 30. The matching part 100 of the first heat exchange part 10, the matching part 300 of the second heat exchange part 30, and the two matching parts of the bridging member all include flat parts. The bridging member 20 includes a through hole 223 and a through hole 222, and the through hole 222 extends substantially laterally. The bridging member 20 further includes a second mounting part 207. The hole of the second mounting part 207 is in communication with the through hole 222, in other words, the mounting part is disposed on the side close to the through hole 222. The opening of the through hole 223 and the opening of the through hole 222 close to the first heat exchange part are located inside the first matching part and are surrounded by the first matching part. In other words, the periphery of the opening of the through hole 223 and the opening of the through hole 222 has a flat part being adapted for welding and sealing. On the other side, the opening of the through hole 223 and the opening of the through hole 222 are located inside the second matching part and are surrounded by the second matching part, in other words, the periphery of the opening of the through hole 223 and the opening of the through hole 222 has a flat part being adapted for welding and sealing. In this way, after the matching part 100 of the first heat exchange part 10 and the first matching part 200 of the bridging member are welded and sealed, the openings of the two through holes of the bridging member are in communication with the corresponding communication openings of the first heat exchange part. Specifically, the through hole 223 of the bridging member corresponds to and is in communication with the communication port 105. The communication port 105 is in communication with the throttle element. The through hole 222 corresponds to and is in communication with the first duct 103 of the first heat exchange part 10; the openings of the two through holes of the bridging member are in communication with the communication openings corresponding to the second heat exchange part, the through hole 223 of the bridging member corresponds to and is in communication with the fourth duct 302 of the second heat exchange part, the through hole 222 of the bridging member corresponds to and is in communication with the first duct 303 of the second heat exchange part 30.

The bridging member 20 further includes two through holes 2032, the arrangement of the through holes 2032 can reduce the weight of the bridging member, and can reduce the area of the flat parts of the two matching parts of the bridging member, and thus the matching parts of the bridging member with the first heat exchange part and the second heat exchange part are reduced, so that the area of contact welding can be relatively controlled and the corresponding welding quality can be improved. The manufacture of the bridging member in this solution is relatively simple, for example, profiles can be used. The profile may be provided with four corresponding through holes, and the bridging member may be manufactured by blanking, processing the mounting part and two matching parts on both sides, and the processing steps may be relatively reduced.

The connecting member includes a connecting block 421 and a port matching piece 423. The connecting block 421 and the port matching piece 423 can be fixed by welding, or can be connected in a sealed manner by a fixing element and a sealing element. The connecting member is provided with a third port 53, a fourth port 54, a fifth port 55, a sixth port 56, a seventh port 57, and an eighth port 58. The connecting block includes a third port part 4213, a fourth port part 4214, a fifth port part 4215, and a sixth port part 4216. The third port part 4213, the fourth port part 4214, the fifth port part 4215, and the sixth port part 4216 may be of an integral structure with the plate part of the connecting block, or each of these port parts may also be a structure that is processed separately and fixed to the plate part of the connecting block by welding. The connecting block is further provided with a through hole 4217, a through hole 4218, and a fixing hole 429 for fixing or position limiting. The connecting member has grooves 4211 and 4212 on the side facing the second heat exchange part 30. The groove is a structure similar to a blind hole. The connecting block is provided with a fourth port 54 and a through hole 4218 on opposite sides of the groove 4211, respectively. The fourth port 54 and the through hole 4218 are in communication with the groove 4211; the connecting block is provided with a fifth port 55 and a through hole 4217, which are in communication with the groove 4212. The sixth port 56 is in communication with the second duct 304 of the second heat exchange part 30. The fifth port 55 is in communication with the fourth duct 302 of the second heat exchange part 30. The third port 53 is in communication with the third duct 301 of the second heat exchange part 30. The fourth port 54 is in communication with the first duct 303 of the second heat exchange part 30. The port matching piece 423 is provided with a seventh port 57 and an eighth port 58. The seventh port 57 corresponds to and is in communication with the through hole 4217 of the connecting block. The eighth port 58 corresponds to and is in communication with the through hole 4218 of the connecting block.

The flow mode of refrigerant in use is shown in the explosion view of FIG. 21, which is only for illustration, and several components are fixed in actual use. A specific vehicle thermal management system includes a refrigerant system and a battery thermal management system. Referring to FIG. 21 and other views, the battery thermal management system includes a first port part 101, a second port part 102 of the heat exchange assembly, and a flow passage part in the first heat exchange part that is in communication with the first port and the second port. The heat of the battery can be transferred to the coolant, which flows through part of the flow passage of the first heat exchange part through the first port 51 or the second port 52, and exchanges heat with the refrigerant of another flow passage in the first heat exchange part. After being cooled down, the coolant flows back to cool the battery. The third port 53, the fourth port 54, the fifth port 55, the sixth port 56, the seventh port 57 and the eighth port 58 are used to in communication with the refrigerant system, respectively. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant flows through the third duct 301 of the second heat exchange part 30, and exchanges heat with the refrigerant of another flow passage in the second heat exchange part 30, then flows to the fourth duct 302. The refrigerant to the fourth duct 302 is divided into two parts: a part of the refrigerant flows through the flow passage formed by the space where the groove 4212 is located and by cooperation of the connecting member and the second heat exchange part, and flows out through the fifth port 55 and the seventh port 57. For example, the refrigerant flows to the front evaporator through the fifth port 55, and flows to the rear evaporator through the seventh port 57, or the refrigerant flows to the rear evaporator through the fifth port 55, and flows to the front evaporator through the seventh port 57. A throttle element may also be set before the front evaporator or the rear evaporator; the other part of the refrigerant enters the throttle element 110 through the hole 223 of the bridging member in communication with the fourth duct 302 of the second heat exchange part and the communication port 105 in communication with the throttle element. After being throttled by the throttle element 110, the refrigerant enters the second duct 104 of the first heat exchange part 10, exchanges heat with the coolant of the coolant flow passage in the refrigerant passage of the first heat exchange part, and flows to the first duct 103. Then the refrigerant passes through the flow passage formed by the through hole 222 and cooperating with the bridging member, the first heat exchange part and the second heat exchange part, and flows to the first duct 303 of the second heat exchange part, and then the refrigerant flows out through the fourth port in communication with the first duct 303, for example so as flow back to the compressor. In addition, the sixth port 56 may be used to be in communication with the refrigerant flowing back from the front evaporator or the rear evaporator. This low-temperature refrigerant flows to the first duct 303 through the second duct 304 of the second heat exchange part, and exchanges heat with the high-temperature refrigerant flowing from the third duct 301 to the fourth duct 302. In the first duct 303, this part of the refrigerant and the rest of the refrigerant may flow back to the compressor through the fourth port after being merged. In addition, the eighth port 58 can be used to be in communication with the refrigerant flowing back from the rear evaporator or the front evaporator. This part of the low-temperature refrigerant flows to the fourth port through the flow passage formed by the groove 4211 and cooperating with the connecting member and the second heat exchange part. The three parts of refrigerants are merged and then flow back to the compressor through the fourth port. The flow direction in this specification is only for illustration, not for restriction or as excluded requirement, and other components can be added therein, for example adding other control valves before the compressor. A second mounting part 207 is further provided on the bridging member 20 for mounting the sensing element 250, such as a temperature sensing element. The sensor head 2501 for temperature sensing passes through the mounting part and is located in the flow passage where the through hole 222 is located. In this way, the temperature of the refrigerant after passing through the first heat exchange part or the outlet temperature of the evaporator can be obtained.

In this solution, several refrigerant connecting ports are arranged in the connecting member, so that the connection is more convenient in use, and the pipelines are also concentrated on the same side.

Figure 26:
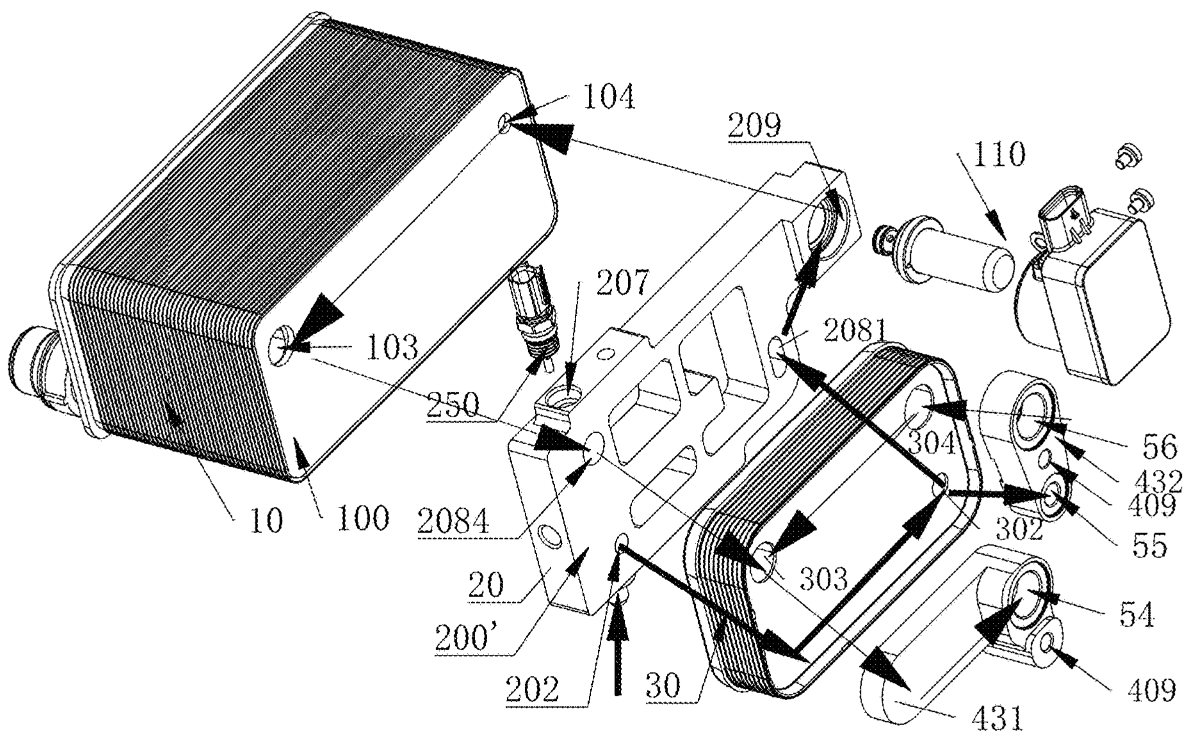
FIG. 26 is an exploded schematic view of the heat exchange assembly shown in FIG. 25.
Figure 27:
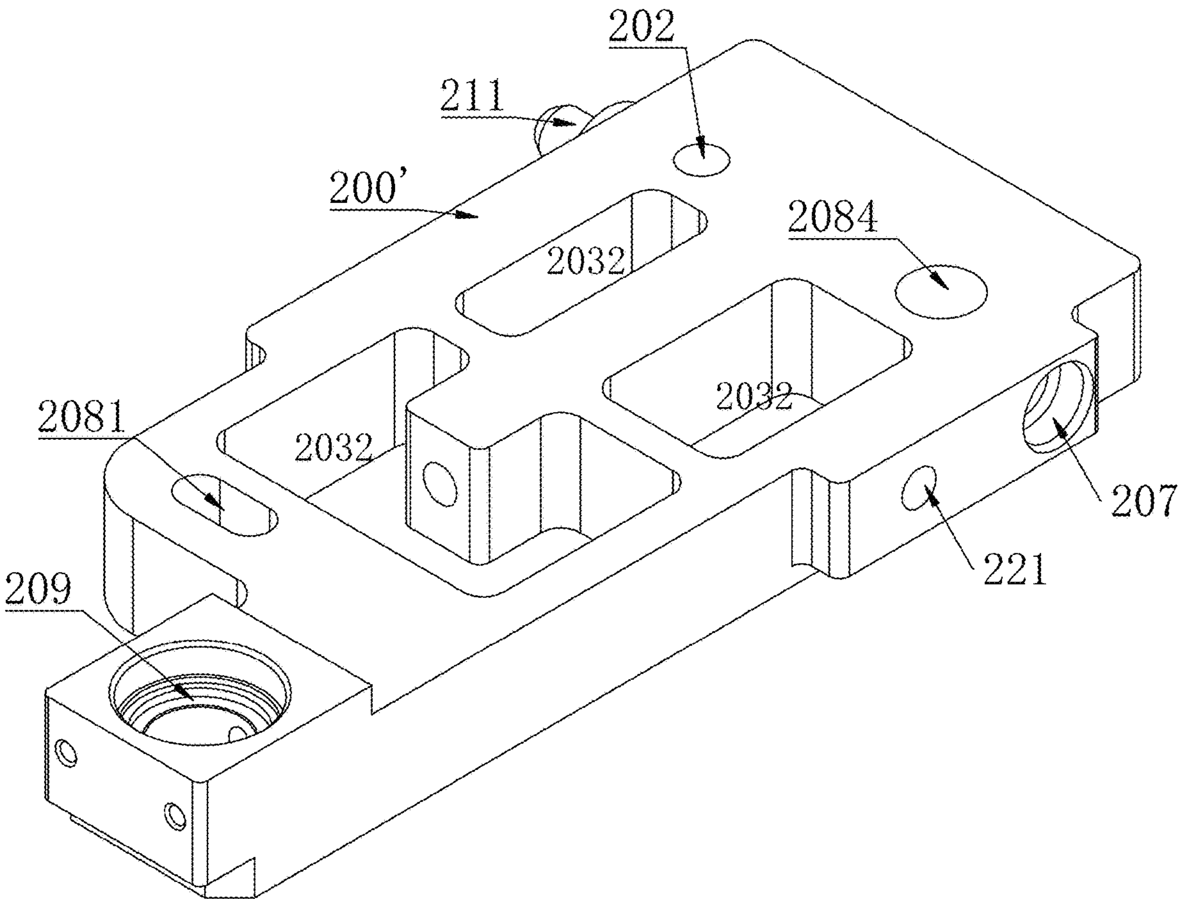
FIG. 27 is a schematic perspective view of the bridging member of the heat exchange assembly shown in FIG. 25.
Figure 28:
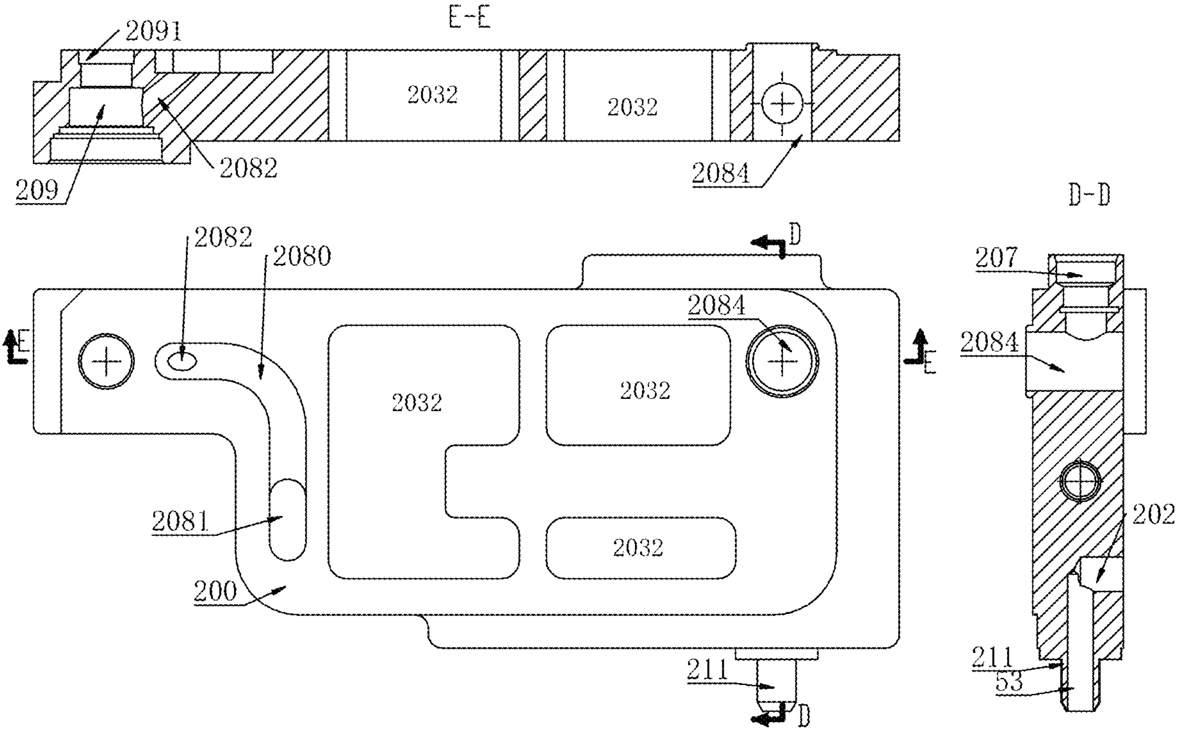
FIG. 28 is a front view of the bridging member shown in FIG. 27 and schematic cross-sectional views of the bridging member taken along E-E direction and D-D direction.
Figure 29:
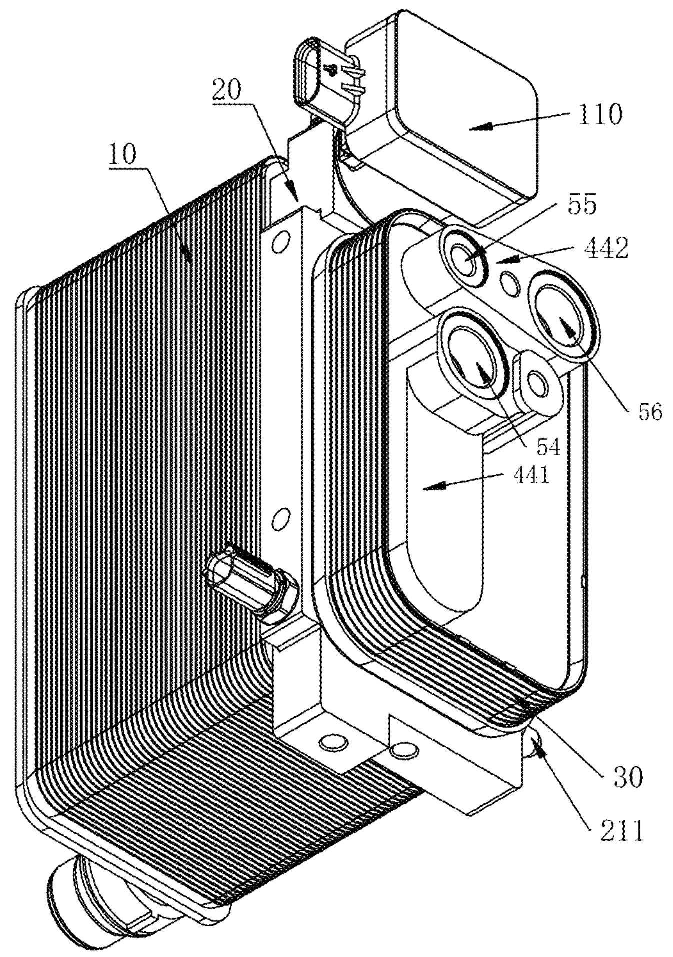
FIG. 29 is a schematic perspective view of the fifth embodiment of the heat exchange assembly.

The heat exchange assembly may also be shown in FIG. 25 to FIG. 28, FIG. 25 is a schematic perspective view of the fourth embodiment of the heat exchange assembly, FIG. 26 is an exploded schematic view of the heat exchange assembly, FIG. 27 is a schematic perspective view of the bridging member of the heat exchange assembly, FIG. 28 is a front view of the bridging member shown in FIG. 27 and a schematic cross-sectional view of the bridging member along the E-E direction and the D-D direction.

The heat exchange assembly includes a first heat exchange part 10, a throttle element 110, a bridging member 20, a second heat exchange part 30, and a connecting member 40. Most of the bridging member 20 is located between the first heat exchange part 10 and the second heat exchange part 30, the connecting member 40 is located on the other side of the second heat exchange part 30. That is, the bridging member 20 and the connecting member 40 are respectively arranged on both sides of the second heat exchange part. The first heat exchange part 10, the bridging member 20 and the second heat exchange part 30 are fixed by welding, or the first heat exchange part 10, the bridging member 20, the second heat exchange part 30 and the connecting member are fixed by welding. The first heat exchange part 10 is larger than the second heat exchange part 30.

The first heat exchange part 10 has a heat exchange core body and two flow passages through which fluid flows for heat exchange, and the two fluid flow passages are separated from each other. The first heat exchange part 10 includes interlayer flow passages separated by stacks of plates. At least two fluids can flow through the first heat exchange part 10, these two fluids may exchange heat in the first heat exchange part, for example, one fluid is a refrigerant, and the other fluid may be a coolant for cooling heating elements such as batteries. In addition, the heat exchange part may also be used for three fluids to flow through. For example, one fluid is refrigerant, the other two fluids may be coolant. The two coolants may be controlled to selectively exchange heat with the refrigerant, and then the coolant may be used to cool the components to be cooled after heat exchange and temperature reduction. The following description is given by taking two fluids flowing through the first heat exchange part as an example.

The heat exchange assembly has a first port 51, a second port 52, a third port 53, a fourth port 54, a fifth port 55 and a sixth port 56. The first heat exchange part is provided with a first port part 101 and a second port part 102. The bridging member 20 is provided with a third port part 211. The connecting member 40 is provided with a fourth port 54, a fifth port 55 and a sixth port 56. The throttle element 110 and the bridging member 20 are fixedly arranged or position limited arranged. The first heat exchange part 10 has four ducts, such as a duct 103 and a second duct 104 (the other two ducts are not shown). The first heat exchange part 10 includes a first port part 101 and a second port part 102. The first port part 101 has a first port 51 for being in communication with the coolant. The second port part 102 has a second port 52 for being in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding.

The bridging member 20 has a first matching part 200 and a second matching part 200'. Accordingly, the first heat exchange part 10 has a matching part 100, and the matching part 100 is correspondingly matched with the first matching part 200 of the bridging member. The second heat exchange part 30 has a matching part 300, and the matching part 300 is correspondingly matched with the second matching part 200' of the bridging member; and the matching part 100 of the first heat exchange part 10, the matching part 300 of the second heat exchange part 30 and the two matching parts of the bridging member all include flat parts. The hole or groove or the opening of the guide part of the bridging member for communication on the side of the first matching part 200 are all located inside the first matching part. In addition, the periphery of each communication opening is surrounded by the first matching part. The first heat exchange part has a corresponding communication opening at a position corresponding to each communication opening of the bridging member. Each communication opening of the first heat exchange part is located inside the matching part thereof, and each communication opening is surrounded by the matching part. In this way, after the matching part 100 of the first heat exchange part 10 and the first matching part 200 of the bridging member are welded and sealed, the communication opening of the bridging member may be in communication with the communication opening corresponding to the first heat exchange part. In other words, the periphery of each communication opening includes a part of the matching part. The two communication openings form a substantially closed structure at the oppositely arranged matching parts. The first heat exchange part 10 has the opening of the first duct 103 and the opening of the second duct 104 on the side opposite to the bridging member 20. The bridging member 20 has corresponding holes 2084 and 2091 on the side opposite to the first heat exchange part 10. The opening of the hole 2084 corresponds to the position of the opening of the first duct 103 of the first heat exchange part. The opening of the hole 2091 corresponds to the position of the opening of the second duct 104 of the first heat exchange part. In addition, the bridging member 20 also has a groove 2080 on the side opposite to the first heat exchange part 10, and one side of the groove 2080 is in communication with the hole 2081. On the other side of the groove, there is also an inclined hole 2082. The other end of the inclined hole 2082 is in communication with the hole of the mounting part 209. In this way, the hole of the mounting part 209 is in communication with the hole 2081 through the inclined hole 2082 and the groove 2080.

The matching part 300 of the second heat exchange part 30 corresponds to the position of the second matching part 200' of the bridging member. After the second heat exchange part is welded and sealed with the bridging member, the communication openings of the bridging member on this side are in communication with the communication openings of the second heat exchange part, respectively. Specifically, the second heat exchange part 30 has the openings of three ducts on the side opposite to the bridging member 20: the openings of the third duct 301, the fourth duct 302, and the first duct 303, the bridging member 20 has the opening of the guide hole 202, the opening of the hole 2081 and the opening of the hole 2084 on the side opposite to the second heat exchange part 30, that is, on the second matching part. The opening of the third duct 301 of the second heat exchange part corresponds to the opening of the guide hole 202, the opening of the fourth duct 302 corresponds to the position of the opening of the hole 2081. The opening of the first duct 303 corresponds to the position of the opening of the hole 2084.

The bridging member 20 includes a third port part 211, a second mounting part 207 and a mounting part 209. The third port part 211 has a third port 53. The third port part 211 includes an outwardly protruding structure. The third port part 211 may be a structure integrated with the main body of the bridging member, or may be a structure that is processed separately and fixed to the main body of the bridging member by welding. The second mounting part 207 is used for mounting the sensing element, and the mounting part 209 is used for mounting the throttle element. The hole of the second mounting part 207 is in communication with the hole 2084. The sensor head 2501 for temperature sensing of the temperature sensing element passes through the second mounting part 207 and is located in the flow passage where the hole 2084 is located. In this way, the temperature of the refrigerant after passing through the first heat exchange part or the outlet temperature of the evaporator may be obtained. In addition, the mounting direction of the throttle element may also be other directions, for example, the mounting part is arranged to extend from the side of the bridging member to an interior of the bridging member, and an axis of the throttle element is substantially parallel to the length direction of the bridging member.

In addition, the bridging member 20 is provided with three through holes 2032, so as to reduce the weight of the bridging member and reduce the area of the flat part to be welded, thereby improving the welding quality. The bridging member 20 is further provided with a fixing hole 221 for fixing.

The connecting member includes a first connecting part 431 and a second connecting part 432. The first connecting part 431 includes a fourth port 54, and the second connecting part 432 includes a fifth port 55 and a sixth port 56. The first connecting part 431 has a space corresponding to the first duct 303 of the second heat exchange part 30 to realize the flow path from the first duct 303 to the fourth port, as shown in the figure. In addition, the flow path may also be fixed at a corresponding position around the first duct 303 in a joint manner. The fifth port 55 of the second connecting part 432 corresponds to and fits with the fourth hole 302 of the second heat exchange part 30. The sixth port 56 of the second connecting part 432 corresponds to and fits with the second hole 304 of the second heat exchange part 30. The connecting member may further include a fixing piece 450 for fixing or position limiting. The first connecting part 431 and the second connecting part 432 may have fixing holes. The fixing piece 450 may be fixedly arranged or position limited arranged to the fixing hole 409.

The heat exchange assembly can facilitate the installation and connection of the thermal management system, reduce the number of connected pipes, and reduce the volume of the system. Taking the heat exchange assembly for a vehicle thermal management system as an example, it should be noted that these components are fixed in actual use. For the sake of clarity, the flow of the refrigerant is shown in the exploded view, which is only for clarity and explanation. In a specific vehicle thermal management system, the vehicle thermal management system includes a refrigerant system and a battery thermal management system. Referring to FIG. 26 and other views, the battery thermal management system includes a first port part 101 and a second port part 102 of the heat exchange assembly, and a flow passage part in the first heat exchange part that is in communication with the first port and the second port. The heat of the battery can be transferred to the coolant, which flows through part of the flow passage of the first heat exchange part through the first port 51 or the second port 52, and exchanges heat with the refrigerant of another flow passage in the first heat exchange part. After being cooled down, the coolant flows back to cool the battery. The third port 53, the fourth port 54, the fifth port 55 and the sixth port 56 are used to be in communication with the refrigerant system, respectively. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant passes through the guide hole 202 and flows to the third duct 301 of the second heat exchange part, and flows to the fourth duct 302 after heat exchange with the refrigerant of another flow passage in the second heat exchange part 30. The refrigerant to the fourth duct 302 is divided into two parts: a part of the refrigerant flows out from the fifth port 55 through the second connecting part 432, for example, to the front evaporator or other evaporators through the fifth port 55, and a throttle element may be arranged in front of the front evaporator. The other part of the refrigerant enters the throttle element 110 through the hole 2081 of the bridging member, the groove 2080 and the inclined hole 2082. After being throttled by the throttle element 110, the other part of refrigerant enters the second duct 104 of the first heat exchange part 10 through the hole 2091, and exchanges heat with the coolant of the coolant passage in the refrigerant passage of the first heat exchange part, and flows to the first duct 103, and then flows out through the hole 2084 of the bridging member, the first duct 303 of the second heat exchange part, and the fourth port communication with the first duct 303, such as flowing back to the compressor. In addition, the sixth port 56 may be used to be in communication with the refrigerant flowing back from the front evaporator or other evaporator. This low-temperature refrigerant flows to the first duct 303 through the second duct 304 of the second heat exchange part, and exchanges heat with the high-temperature refrigerant flowing from the third duct 301 to the fourth duct 302. In the first duct 303, the two parts of the refrigerant may flow back to the compressor through the fourth port after being merged. In this way, part of the low-temperature refrigerant can be used to cool the high-temperature refrigerant, which may reduce the condensing temperature of the refrigerant without increasing the temperature of the refrigerant flowing back the compressor. The flow direction in this specification is only for illustration, not for restriction or as an excluded requirement, and other components can be added therein, such as adding other control valves before the compressor.

Figure 30:
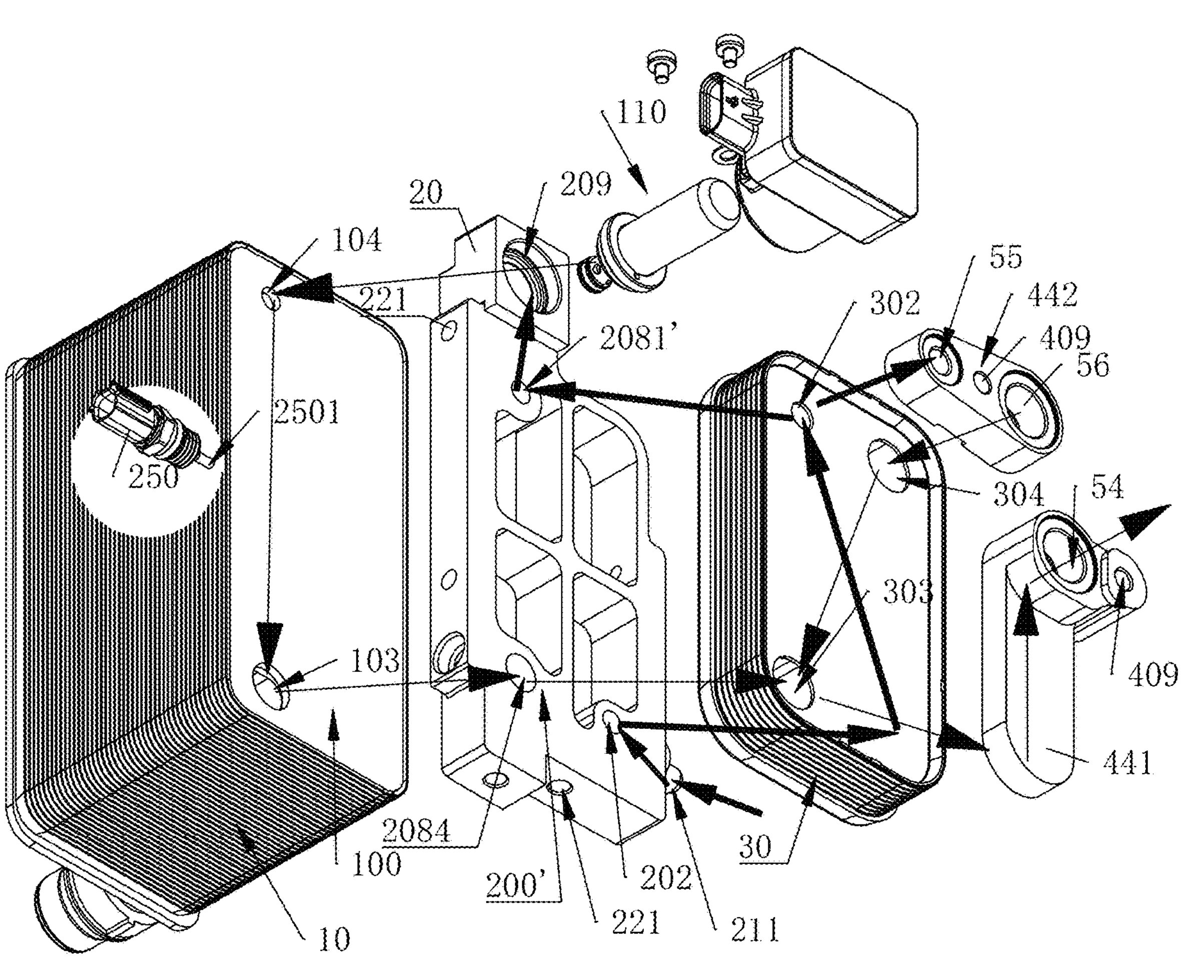
FIG. 30 is an exploded schematic view of the heat exchange assembly shown in FIG. 29.
Figures 31, 32:
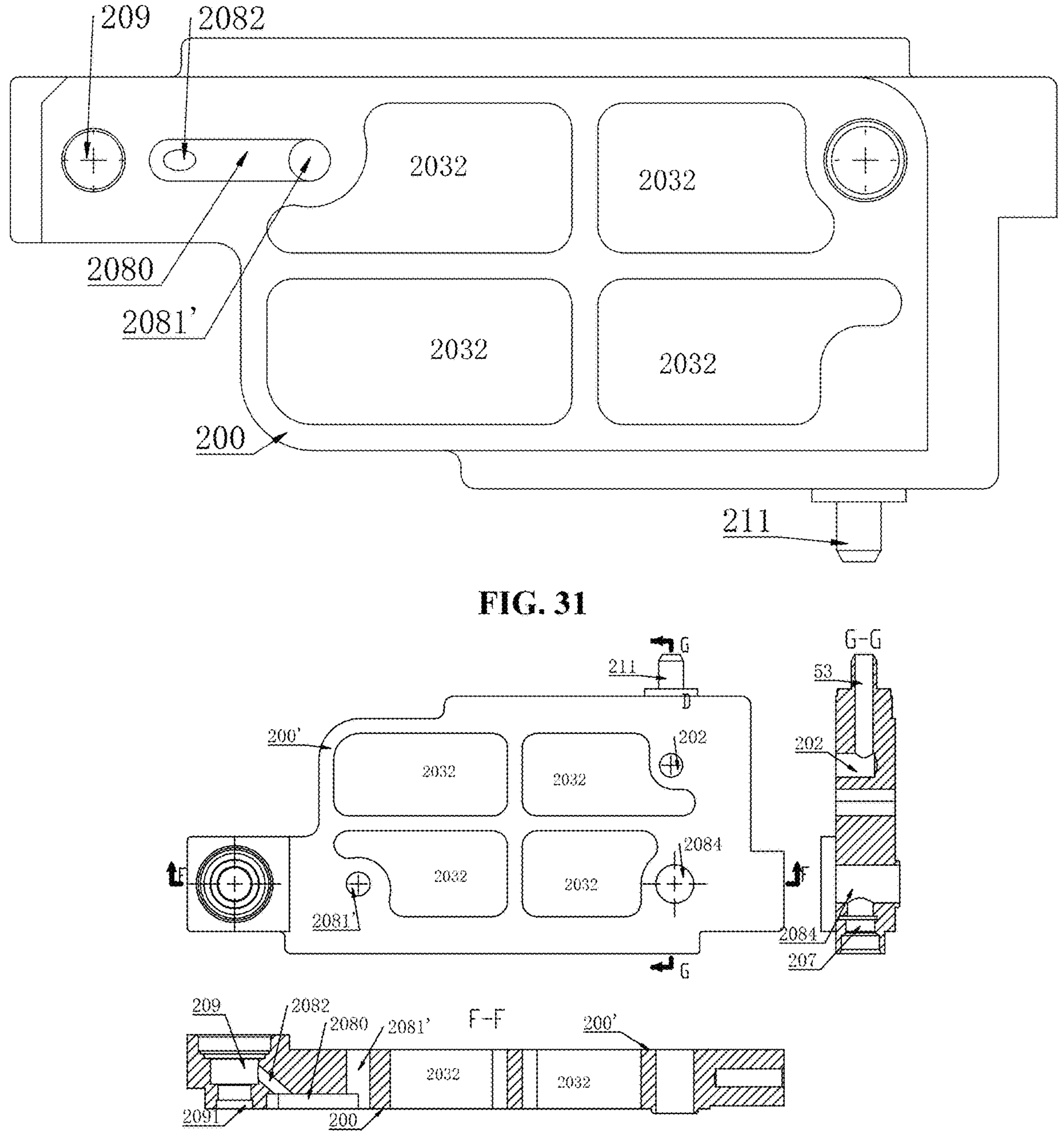
FIG. 31 is a schematic view of the bridging member of the heat exchange assembly shown in FIG. 29.
FIG. 32 is a schematic view of the bridging member shown in FIG. 31 viewed from another direction and schematic cross-sectional views taken along G-G direction and F-F direction.

The heat exchange assembly may also be shown in FIG. 29 to FIG. 32, FIG. 29 is a schematic perspective view of the fifth embodiment of the heat exchange assembly, FIG. 30 is an exploded schematic view of the heat exchange assembly, FIG. 31 is a schematic view of the bridging member of the heat exchange assembly, FIG. 32 is a schematic view of the bridging member shown in FIG. 31 in another direction and a schematic view of a cross-section in the G-G direction and the F-F direction. The heat exchange assembly includes a first heat exchange part 10, a throttle element 110, a bridging member 20, a second heat exchange part 30, and a connecting member. Most of the bridging member 20 is located between the first heat exchange part 10 and the second heat exchange part 30, the connecting member is located on the other side of the second heat exchange part 30, that is, the bridging member 20 and the connecting member are respectively arranged on both sides of the second heat exchange part. The first heat exchange part 10, the bridging member 20 and the second heat exchange part 30 are fixed by welding, or the first heat exchange part 10, the bridging member 20, the second heat exchange part 30 and the connecting member are fixed by welding. The first heat exchange part 10 is larger than the second heat exchange part 30.

The first heat exchange part 10 has a heat exchange core body, the first heat exchange part 10 at least includes two flow passages through which fluid flows for heat exchange, and the two fluid flow passages are separated from each other. The first heat exchange part 10 includes interlayer flow passages separated by stacks of plates. At least two fluids can flow through the first heat exchange part 10, the two fluids can exchange heat in the first heat exchange part. For example, one fluid is a refrigerant, and the other fluid may be a coolant for cooling heating elements such as batteries or cooling the compartment. In addition, the heat exchange part can also be used for three fluids to flow through. For example, one fluid is refrigerant, the other two fluids may be coolant. The two coolants may be controlled to selectively exchange heat with the refrigerant, and then the coolant may be used to cool the components to be cooled after heat exchange and temperature reduction. The following description is given by taking two fluids flowing through the first heat exchange part as an example.

The heat exchange assembly has a first port 51, a second port 52, a third port 53, a fourth port 54, a fifth port 55 and a sixth port 56. The first heat exchange part is provided with a first port part 101 and a second port part 102. The bridging member 20 is provided with a third port part 211. The connecting member is provided with a fourth port 54, a fifth port 55 and a sixth port 56. The throttle element 110 and the bridging member 20 are fixedly arranged or position limitedly arranged. The first heat exchange part 10 has four ducts such as a first duct 103 and a second duct 104 (two ducts in communication with the coolant are not shown). The first heat exchange part 10 includes a first port part 101 and a second port part 102. The first port part 101 has a first port 51 for being in communication with the coolant. The second port part 102 has a second port 52 for being in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding. The first port part and the second port part may also be fixed together with the first heat exchange part in the form of pipe joints.

The bridging member 20 has a first matching part 200 and a second matching part 200'. Accordingly, the first heat exchange part 10 has a matching part 100, and the matching part 100 is correspondingly matched with the first matching part 200 of the bridging member. The second heat exchange part 30 has a matching part 300, and the matching part 300 is correspondingly matched with the second matching part 200' of the bridging member; the matching part 100 of the first heat exchange part 10, the matching part 300 of the second heat exchange part 30, and the two matching parts of the bridging member all include flat parts. The hole or groove or the opening of the guide part for communication of the bridging member provided on the side of the first matching part 200 are all located inside the first matching part. In addition, the periphery of each communication opening is surrounded by the first matching part. The first heat exchange part has a corresponding communication opening at a position corresponding to each opening of the bridging member for communication. Each communication opening of the first heat exchange part is located inside the matching part thereof, and each communication opening is surrounded by the matching part. In this way, after the matching part 100 of the first heat exchange part 10 and the first matching part 200 of the bridging member are welded and sealed, the communication opening of the bridging member can be in communication with the communication opening corresponding to the first heat exchange part. In other words, the periphery of each communication opening includes a part of the matching part. The two communication openings form a substantially closed structure at the matching parts being opposite arranged. The first heat exchange part 10 has the opening of the first duct 103 and the opening of the second duct 104 on the side opposite to the bridging member 20. The bridging member 20 has corresponding holes 2084 and 2091 on the side opposite to the first heat exchange part 10. The opening of the hole 2084 corresponds to the position of the opening of the first duct 103 of the first heat exchange part. The opening of the hole 2091 corresponds to the position of the opening of the second duct 104 of the first heat exchange part. In addition, the bridging member 20 also has a groove 2080 on the side opposite to the first heat exchange part 10, and the groove 2080 is in communication with the hole 2081'. On the other side of the groove, an inclined hole 2082 is further provided. The other end of the inclined hole 2082 is in communication with the hole of the mounting part 209. In this way, the hole of the mounting part 209 is in communication with the hole 2081' through the inclined hole 2082 and the groove 2080.

The matching part 300 of the second heat exchange part 30 corresponds to the position of the second matching part 200' of the bridging member. After the second heat exchange part is welded and sealed with the bridging member, the communication openings of the bridging member on this side are in communication with the communication openings of the second heat exchange part. Specifically, the second heat exchange part 30 has the openings of three ducts on the side opposite to the bridging member 20: the openings of the third duct 301, the fourth duct 302, and the first duct 303, the bridging member 20 has the opening of the guide hole 202, the opening of the hole 2081' and the opening of the hole 2084 on the side opposite to the second heat exchange part 30, The opening of the third duct 301 of the second heat exchange part corresponds to the position of the opening of the guide hole 202, the opening of the fourth duct 302 corresponds to the position of the opening of the hole 2081'. The opening of the first duct 303 corresponds to the position of the opening of the hole 2084.

The bridging member 20 includes a third port part 211, a second mounting part 207 and a mounting part 209. The third port part 211 has a third port 53. The third port part 211 includes an outwardly protruding structure. The third port part 211 may be a structure integrated with the main body of the bridging member, or may be a structure that is processed separately and fixed to the main body of the bridging member by welding. The second mounting part 207 is used for cooperating with mounting the sensing element 250. The mounting part 209 is used for cooperating with mounting the throttle element 110. The hole of the second mounting part 207 is in communication with the hole 2084, and the sensing element may be a temperature sensing element. The sensor head 2501 for temperature sensing passes through the second mounting part 207 and is located in the flow passage where the hole 2084 is located, in this way, the temperature of the refrigerant after passing through the first heat exchange part or the outlet temperature of the evaporator may be obtained.

In addition, the bridging member 20 is provided with four holes 2032, so as to reduce the weight of the bridging member and reduce the area of the flat part to be welded, thereby improving the welding quality. The bridging member 20 is further provided with a fixing hole 221 for fixing. The connecting member includes a first connecting part 441 and a second connecting part 442. The first connecting part 441 includes a fourth port 54, and the second connecting part 442 includes a fifth port 55 and a sixth port 56. The first connecting part 441 has a space corresponding to the first duct 303 of the second heat exchange part 30 to realize the flow path from the first duct 303 to the fourth port. In addition, the flow path may also be fixed at a corresponding position around the first duct 303 in a joint manner. The fifth port 55 of the second connecting part 442 corresponds to and fits with the fourth hole 302 of the second heat exchange part 30. The sixth port 56 of the second connecting part 442 corresponds to and fits with the second hole 304 of the second heat exchange part 30. The connecting member may further include a fixing piece 450 for fixing or position limiting. The first connecting part 441 and the second connecting part 442 may have fixing holes 409. The fixing piece 450 may be fixedly arranged or position limited arranged to the fixing hole 409.

The heat exchange assembly can facilitate the installation and connection of the thermal management system, reduce the number of connected pipes, and reduce the volume of the system. Taking the heat exchange assembly for a vehicle thermal management system as an example, it should be noted that these components are fixed in actual use. For the sake of clarity, the flow of the refrigerant is shown in the exploded view, which is only for clarity and explanation. In a specific vehicle thermal management system, the vehicle thermal management system includes a refrigerant system and a battery thermal management system. Referring to FIG. 30 and other views, the battery thermal management system includes a first port part 101, a second port part 102 of the heat exchange assembly, and a flow passage part in the first heat exchange part that is in communication with the first port and the second port. The heat of the battery can be transferred to the coolant, which flows through part of the flow passage of the first heat exchange part through the first port 51 or the second port 52, and exchanges heat with the refrigerant of another flow passage in the first heat exchange part. After being cooled down, the coolant flows back to cool the battery. The third port 53, the fourth port 54, the fifth port 55, and the sixth port 56 are used for the communication of the refrigerant system. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant passes through the guide hole 202 to the third duct 301 of the second heat exchange part, and flows to the fourth duct 302 after heat exchange with the refrigerant of another flow passage in the second heat exchange part 30. The refrigerant to the fourth duct 302 is divided into two parts: a part of the refrigerant flows out from the fifth port 55 through the second connecting part 442, for example, to flow to the front evaporator or other evaporators through the fifth port 55, and a throttle element may be arranged before the front evaporator. The other part of the refrigerant enters the throttle element 110 through the hole 2081' of the bridging member, the groove 2080 and the inclined hole 2082. After being throttled by the throttle element 110, the refrigerant flows through the hole 2091 to the second duct 104 of the first heat exchange part 10, exchanges heat with the coolant of the coolant passage in the refrigerant flow passage of the first heat exchange part, and flows to the first duct 103. The refrigerant flows out through the hole 2084 of the bridging member, the first duct 303 of the second heat exchange part, and the fourth port communication with the first duct 303, for example to flow back to the compressor; In addition, the sixth port 56 may be used to be in communication with the refrigerant flowing back from the front evaporator or other evaporator. The low-temperature refrigerant flows to the first duct 303 through the second duct 304 of the second heat exchange part, and exchanges heat with the high-temperature refrigerant flowing from the third duct 301 to the fourth duct 302. In the first duct 303, the two parts of the refrigerant can flow back to the compressor through the fourth port after being merged. In this way, part of the low-temperature refrigerant is used to cool the high-temperature refrigerant, which may reduce the condensing temperature of the refrigerant without increasing the temperature of the refrigerant back to the compressor. The flow direction in this specification is only for illustration, not for restriction or as an excluded requirement, and other components can be added therein, such as adding other control valves before the compressor.

Figure 33:
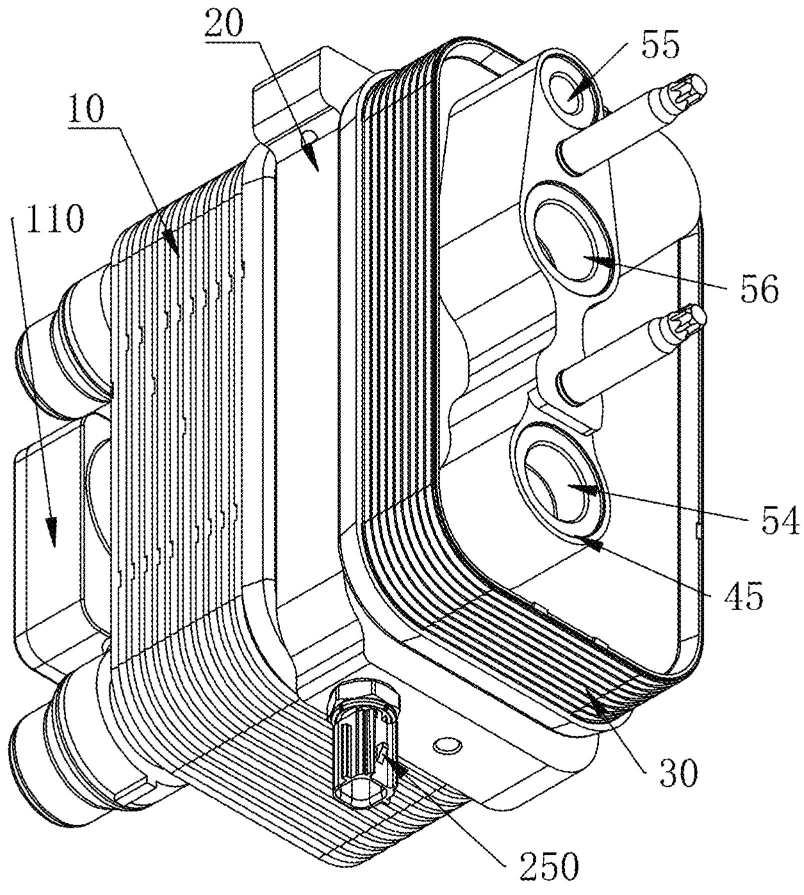
FIG. 33 is a schematic perspective view of the sixth embodiment of the heat exchange assembly.
Figure 34:
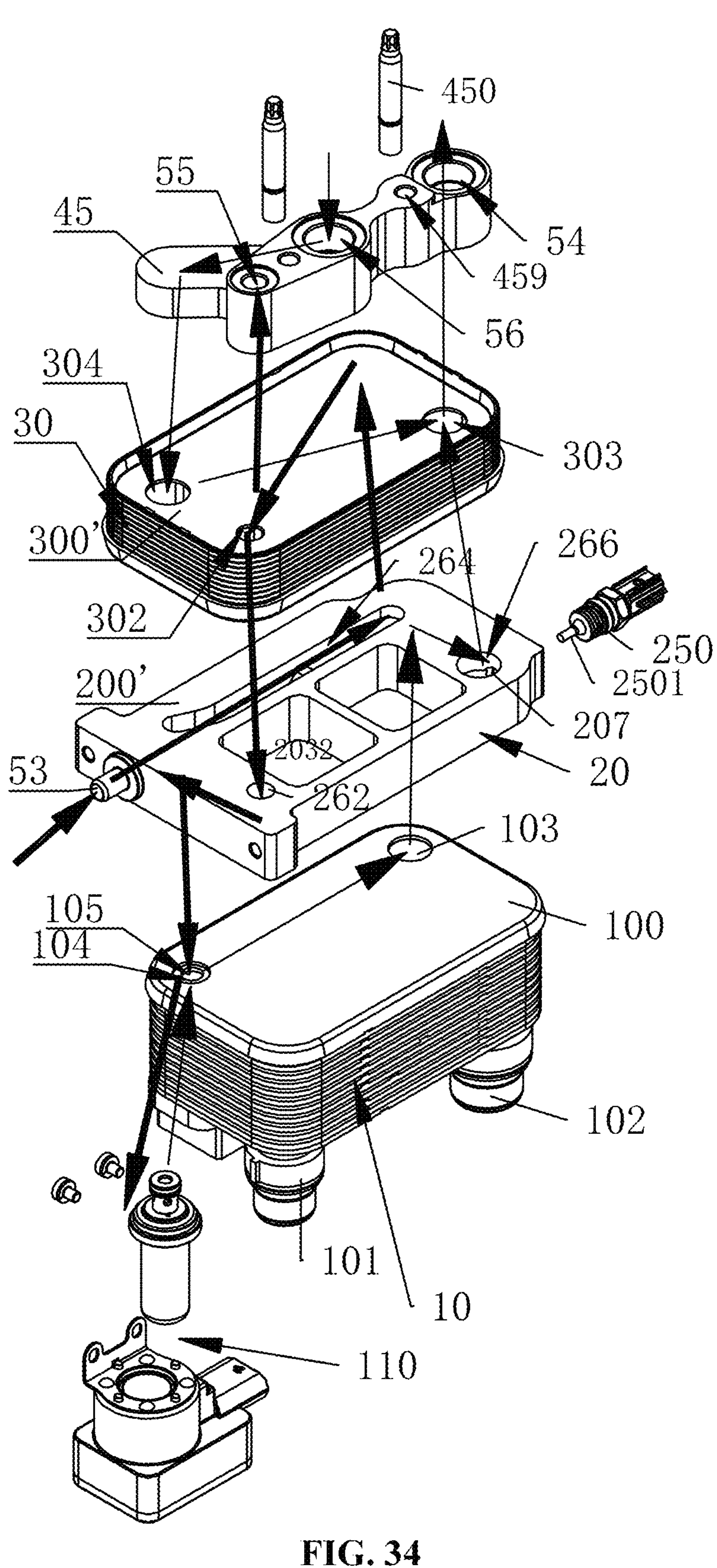
FIG. 34 is an exploded schematic view of the heat exchange assembly shown in FIG. 33.
Figure 35:
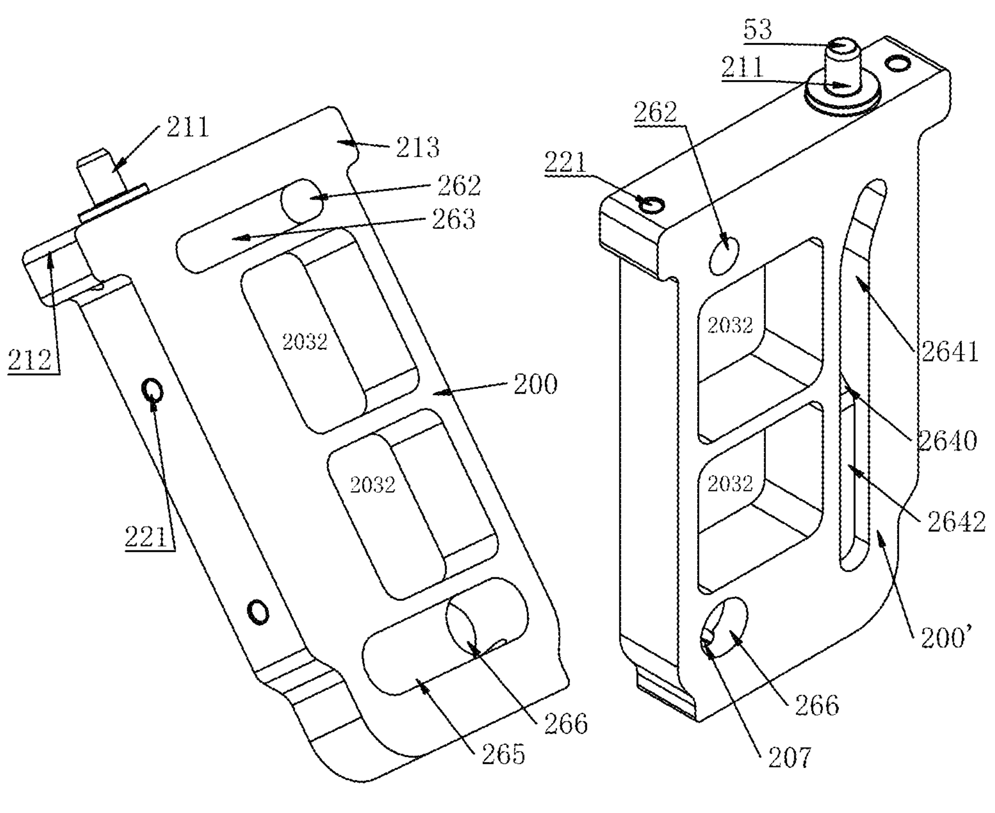
FIG. 35 is a perspective view of the bridging member of the heat exchange assembly shown in FIG. 33 in two directions.
Figure 36:
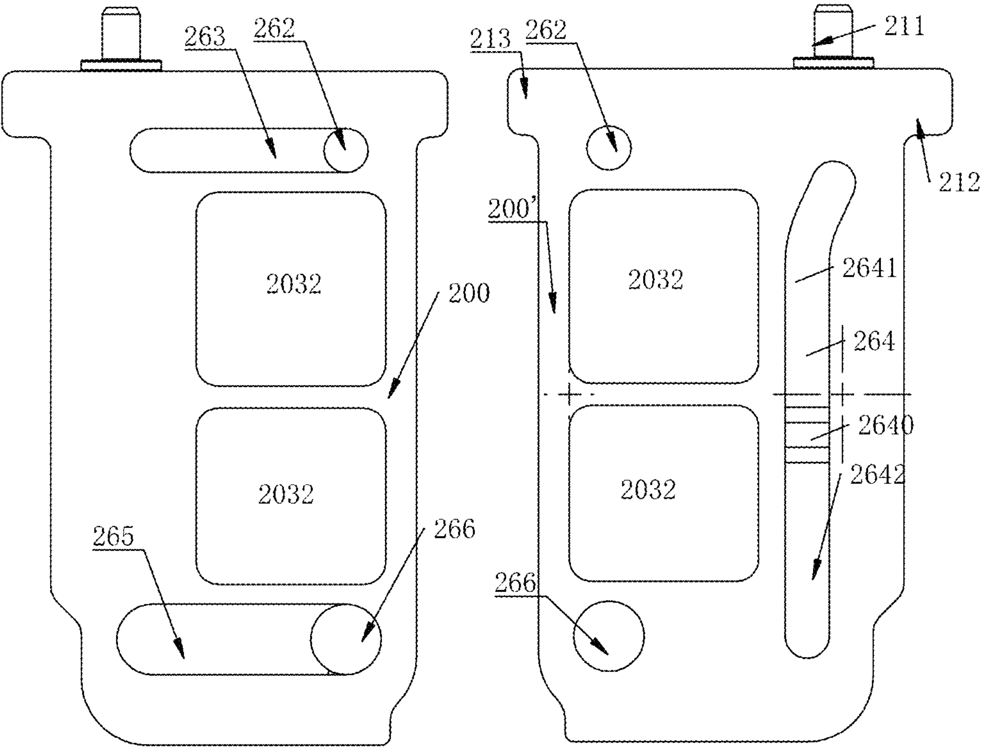
FIG. 36 is a schematic front view and a schematic rear view of the bridging member shown in FIG. 35.
Figure 37:
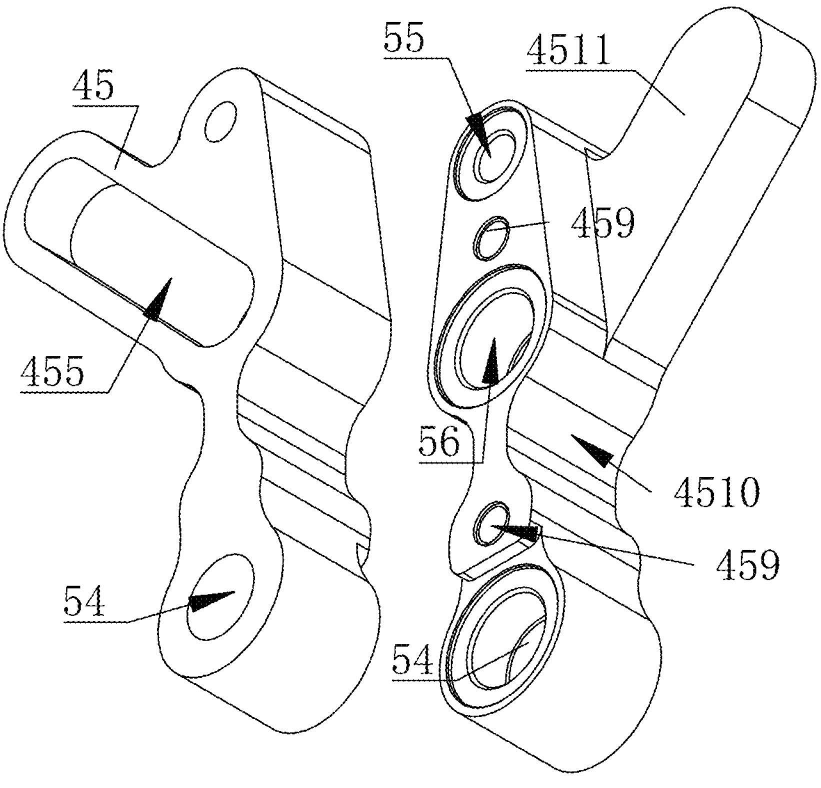
FIG. 37 is a perspective view of the connecting member of the heat exchange assembly shown in FIG. 33 in two directions.

The heat exchange assembly may also be shown in FIG. 33 to FIG. 37, FIG. 33 is a schematic perspective view of the sixth embodiment of the heat exchange assembly, FIG. 34 is an exploded schematic diagram of the heat exchange assembly, FIG. 35 is a schematic perspective view of the bridging member of the heat exchange assembly in two directions, FIG. 36 is a schematic front view and a rear schematic view of the bridging member shown in FIG. 35, FIG. 37 is a perspective view of the connecting piece of the heat exchange assembly shown in FIG. 33 in two directions. The heat exchange assembly includes a first heat exchange part 10, a throttle element 110, a bridging member 20, a second heat exchange part 30, and a connecting piece 45. Most of the bridging member 20 is located between the first heat exchange part 10 and the second heat exchange part 30, the connecting piece 45 is located on the other side of the second heat exchange part 30. That is, the bridging member 20 and the connecting piece 45 are arranged on both sides of the second heat exchange part, respectively. The first heat exchange part 10, the bridging member 20 and the second heat exchange part 30 are fixed by welding, or the first heat exchange part 10, the bridging member 20, the second heat exchange part 30 and the connecting piece are fixed by welding.

The first heat exchange part 10 has a heat exchange core body and two flow passages through which fluid flows for heat exchange, and the two fluid flow passages are separated from each other. The first heat exchange part 10 includes interlayer flow passages separated by stacks of plates. At least two fluids can flow through the first heat exchange part 10, the c fluids can exchange heat in the first heat exchange part, for example, one fluid is a refrigerant, and the other fluid may be a coolant for cooling heating elements such as batteries. In addition, the heat exchange part may also be used for three fluids to flow through. For example, one fluid is refrigerant, the other two fluids may be coolant. The two coolants may be controlled to selectively exchange heat with the refrigerant, and then the coolant may be used to cool the components to be cooled after heat exchange and temperature reduction. Specifically, two fluids are used as examples to illustrate.

The heat exchange assembly has a first port 51, a second port 52, a third port 53, a fourth port 54, a fifth port 55 and a sixth port 56. The first heat exchange part is provided with a first port part 101 and a second port part 102. The bridging member 20 is provided with a third port part 211. The connecting member 45 is provided with a fourth port 54, a fifth port 55 and a sixth port 56. The throttle element 110 and the first heat exchange part 10 are fixedly arranged or position limitedly arranged. The first heat exchange part 10 has four ducts such as a first duct 103 and a second duct 104 (not all shown in the figure). The first heat exchange part is further provided with a pipe with a communication port 105 in the second duct 104. The second duct 104 is not in communication with at the side near the bridging member, and the communication port 105 is in communication with the inlet of the throttle element 110. The first port part 101 of the first heat exchange part 10 has a first port 51 for being in communication with the coolant. The second port part 102 has a second port 52 for being in communication with the coolant. The first port 51 is in communication with the second port 52 through the flow passage of the heat exchange core body. The first port part 101 and the second port part 102 may be a part of the side plate of the first heat exchange part, or the two port parts may be processed separately and fixed to the side plate and/or the heat exchange core body of the first heat exchange part by welding.

The bridging member 20 has a first matching part 200 and a second matching part 200'. Accordingly, the first heat exchange part 10 has a matching part 100, and the matching part 100 is correspondingly matched with the first matching part 200 of the bridging member. The second heat exchange part 30 has a matching part 300, and the matching part 300 is correspondingly matched with the second matching part 200' of the bridging member; the matching part 100 of the first heat exchange part 10, the matching part 300 of the second heat exchange part 30, and the two matching parts of the bridging member all include flat parts. The hole or groove for communication or the opening of the guide part of the bridging member for communication provided on the side of the first matching part 200 are all located inside the first matching part. In addition, the periphery of each communication opening is surrounded by the first matching part. The first heat exchange part has a corresponding communication opening at a position corresponding to each opening of the bridging member for communication. Each communication opening of the first heat exchange part is located inside the matching part thereof, and each communication opening is surrounded by the matching part. In this way, after the matching part 100 of the first heat exchange part 10 and the first matching part 200 of the bridging member are welded and sealed, the communication opening of the bridging member can be in communication with the communication opening corresponding to the first heat exchange part. In other words, the periphery of each communication opening includes a part of the matching part. The two communication openings form a substantially closed structure at the matching parts that are opposite arranged. The matching part 300 of the second heat exchange part 30 corresponds to the position of the second matching part 200' of the bridging member. After the second heat exchange part is welded and sealed with the bridging member, the communication openings of the bridging member on this side are all in communication with the communication openings of the second heat exchange part. Specifically, the second heat exchange part 30 has the openings of three ducts on the side opposite to the bridging member 20: the openings of the third duct 301, the fourth duct 302, and the first duct 303, and the bridging member 20 has the opening of the guide groove 264, the opening of the hole 262 and the opening of the hole 266 on the side opposite to the second heat exchange part 30, that is, in the second matching part. The diameter of the hole 266 is greater than or equal to the diameter of the hole 262. The opening of the third duct 301 of the second heat exchange part corresponds to a part of the opening of the guide groove 264. The opening of the fourth duct 302 corresponds to the position of the opening of the hole 262. The opening of the first duct 303 corresponds to the position of the opening of the hole 266. The guide groove 264 includes a first part 2641, a second part 2642 and a transition part 2640. The first part 2641 is relatively close to the third port part, and the second part 2642 is relatively far away from the third port part; the transition part 2640 is located between the first part 2641 and the second part 2642. The depth of the first part 2641 is greater than the depth of the second part 2642. The depth of the first part 2641 close to the third port part is greater than or equal to half the thickness of the bridging member or close to half the thickness of the bridging member. For example, the depth of the first part 2641 close to the third port part is greater than or equal to one-third of the thickness of the bridging member and less than two-thirds of the thickness of the bridging member. The first part 2641 is in communication with the third port. The first heat exchange part 10 has the opening of the first duct 103 and the communication port 105 in communication with the throttle element on the side opposite to the bridging member 20. The bridging member 20 has corresponding third grooves 263 and fourth grooves 265 on the side opposite to the first heat exchange part 10. The third groove 263 is in communication with the smaller hole 262, the fourth groove 265 is in communication with the larger hole 266. Part of the opening of the fourth groove 265 corresponds to the position of the opening of the first duct 103 of the first heat exchange part. The opening of the third groove 263 is in communication with the communication port 105 of the throttle element. The projection of one of the guide groove 264 and the third port 53 on the front side is at least partially located in the third groove 263, the projection of the guide groove 264 on the front side is at least partially located in the fourth groove 265. The guide groove 264 is at least partially back to the fourth groove 265 and is not in direct communication with the fourth groove 265. The first, second, third, fourth and other serial numbers here are only for distinguishing and explaining, and do not specify the number of grooves or holes.

The bridging member 20 includes a third port part 211, and the third port part 211 has a third port 53. The third port part 211 includes an outwardly protruding structure. The third port part 211 may be a structure integrated with the main body of the bridging member, or may be a structure that is processed separately and fixed to the main body of the bridging member by welding. In addition, the bridging member 20 is provided with two through holes 2032. The first part 2641 of the guide groove 264 is close to the third port part. The second part 2642 of the guide groove 264 is relatively far away from the third port part. The guide groove 264 is generally extended along the length direction; the third port 53 is in communication with the first part 2641 of the guide groove 264. The depth of the second part 2642 of the guide groove 264 is less than half of the thickness of the bridging member, even not greater than 0.4 times the thickness of the bridging member; the depths of the fourth groove 265 and the third groove 263 are both less than half the thickness of the bridging member, even both the depth of the fourth groove 265 and the third groove 263 are not greater than 0.4 times the thickness of the bridging member. In this way, grooves may be provided on both sides of the bridging member to form relatively independent flow passages with the two heat exchange parts, and the size of the entire assembly can be reduced. The thickness of the bridging member herein refers to the thickness of the two matching parts of the bridging member. The bridging member 20 is further provided with two shoulders 212, 213. At least part of the shoulders 212, 213 protrude from the body part, the bridging member 20 is provided with a fixing hole 221, and the fixing hole is provided at least one shoulder or near the shoulder.

The through hole 2032 in this specification is to reduce the weight and make the bridging member suitable for welding with the first heat exchange part and the second heat exchange part. The through hole 2032 penetrates from the side close to the first heat exchange part to the side close to the second heat exchange part of the bridging member. The through hole 2032 is not in communication with the duct of the first heat exchange part. The through hole 2032 is not in communication with the duct of the second heat exchange part. The through hole 2032 is not in communication with the hole or groove that the bridging member uses for communication; the distance between the through hole 2032 and the hole for communication facing the bridging member or close to the first heat exchange part is greater than or equal to 1.5 mm, the distance between the through hole 2032 and the groove for communication facing the bridging member or close to the first heat exchange part is greater than or equal to 1.5 mm; the distance between the through hole 2032 and the hole for communication facing the bridging member or close to the second heat exchange part is greater than or equal to 1.5 mm, the distance between the through hole 2032 and the groove for communication facing the bridging member or close to the second heat exchange part is greater than or equal to 1.5 mm. The connecting member 45 includes a main body part 4510 and an extension part 4511. The connecting member 40 is provided with a fourth port 54, a fifth port 55 and a sixth port 57, and is further provided with a fixing hole 459 for matching, fixing or position limiting. The connecting member 45 has a groove 455 on the side facing the second heat exchange part 30, and the groove 455 has a blind hole-like structure. The groove 455 extends from the extending part to the position where the sixth port 56 is located, and the groove 455 is in communication with the sixth port 56. The connecting member may further include a fixing piece 450 for fixing or position limiting. The fixing piece 450 may be fixedly arranged or position limited arranged to the fixing hole 409. The second heat exchange part has a fourth duct 302, a first duct 303, and a second duct 304 toward the connecting member 40. The fourth port 54 of the connecting member 40 corresponds to the first duct 303. The fifth port 55 corresponds to the fourth duct 302. The sixth port 56 is in communication with the second duct 304 through the groove 455.

The heat exchange assembly can facilitate the installation and connection of the thermal management system, reduce the number of connected pipes, and reduce the volume of the system. Taking the heat exchange assembly for a vehicle thermal management system as an example, it should be noted that these components are relatively fixed in actual use. For the sake of clarity, the flow of the refrigerant is shown in the exploded view, which is only for clarity and explanation. In a specific vehicle thermal management system, the vehicle thermal management system includes a refrigerant system and a battery thermal management system. Referring to FIG. 34 and other views, the battery thermal management system includes a first port part 101, a second port part 102 of the heat exchange assembly, and a flow passage part in the first heat exchange part that is in communication with the first port and the second port. The heat of the battery can be transferred to the coolant, which flows to part of the passage of the first heat exchange part through the first port 51 or the second port 52, and exchanges heat with the refrigerant of another flow passage in the first heat exchange part. After being cooled down, the coolant flows back to cool the battery. The third port 53, the fourth port 54, the fifth port 55 and the sixth port 56 are used to in communication with the refrigerant system, respectively. For example, the refrigerant cooled by the condenser enters the heat exchange assembly through the third port 53, or the refrigerant flowing through the reservoir enters the heat exchange assembly through the third port 53. In this way, the high-temperature and high-pressure refrigerant flows to the third duct 301 of the second heat exchange part through the flow passage formed by the space where the guide groove 264 is located and by cooperation of the bridging member and the second heat exchange part. After heat exchange with the refrigerant of another flow passage in the second heat exchange part 30, the high-temperature and high-pressure refrigerant passes to the fourth duct 302. The refrigerant to the fourth duct 302 is divided into two parts: a part of the refrigerant flows out through the connecting piece 45 and the fifth port 55, for example, flows to the front evaporator or other evaporators through the fifth port 55, and a throttle element may be provided before the evaporator, or the refrigerant is diverted to two evaporators after throttling, or diverted and throttled to the evaporators, etc. The other part of the refrigerant enters the throttle element 110 through the hole 262 of the bridging member, the flow passage formed by the space where the third groove 263 is located and by the cooperation of the bridging member and the first heat exchange part, and the communication port 105 in communication with the throttle element. After being throttled by the throttle element 110, the refrigerant enters the second duct 104 of the first heat exchange part 10, exchanges heat with the coolant in the coolant passage of the first heat exchange part, and flows to the first duct 103, and then the refrigerant passes through the flow passage formed by the bridging member and the matching part of the first heat exchange part, through the hole 266, to the first duct 303 of the second heat exchange part, and flows out through the fourth port corresponding to the first duct 303, for example flow back to the compressor; and the flow passage is formed in the space where the fourth groove 265 is located. In addition, the sixth port 56 may be used to communicate the refrigerant flowing back from the front evaporator and/or other evaporator. This part of the low-temperature refrigerant flows to the second duct 304 of the second heat exchange part through the flow passage formed by the space where the groove 455 is located and by cooperation of the connecting piece 45 and the second heat exchange part, and then the refrigerant flows to the first duct 303, and exchanges heat with the high-temperature refrigerant flowing from the third duct 301 to the fourth duct 302. In the first duct 303, the two parts of the refrigerant may flow back to the compressor through the fourth port 54 after being merged. In this way, part of the low-temperature refrigerant is used to cool the high-temperature refrigerant, which may reduce the condensing temperature of the refrigerant without increasing the temperature of the refrigerant back to the compressor. A second mounting part 207 is further provided in the bridging member 20 for mounting the sensing element 250, such as a temperature sensing element. The sensor head 2501 for temperature sensing passes through the mounting part and is located in the flow passage where the hole 266 and/or the fourth groove 265 are located. In this way, the temperature of the refrigerant after passing through the first heat exchange part or the outlet temperature of the evaporator can be obtained. The second heat exchange part may realize heat exchange between high-temperature refrigerant and part of low-temperature refrigerant, reduce the temperature of the high-temperature refrigerant, and prevent the temperature of the refrigerant back to the compressor from being too high, thereby improving the efficiency.

The heat exchange assembly includes a first heat exchange part, a bridging member, and a second heat exchange part. The bridging member is at least partially located between the first heat exchange part and the second heat exchange part, and the fluid communication between the two heat exchange parts can be relatively conveniently realized by the bridging member. Different system requirements can be realized by changing the structure of the bridging member, so that the systematical pipeline is simple, the pipeline settings between ports can be reduced, and the system connection is simple and convenient. The refrigerant flow passage of the first heat exchange part of the assembly may be a single flow path, that is, flow from the second duct 104 to the first duct 103, or may be a three-flow path, that is, the first heat exchange part is substantially divided into three parts horizontally. The first flow path is from the lowermost part of the second duct 104 to the lowermost part of the first duct 103, the second flow path is from the middle part of the first duct 103 to the middle part of the second duct 104, the third flow path is from the upper part of the second duct 104 to the upper part of the first duct 103. Therefore, only the refrigerant flowing out of the first duct 103 is described in the embodiment. Unless otherwise specified, the thickness of the bridging member refers to the thickness between the flat parts of the two matching parts of the bridging member. The flow direction in this specification is only for illustration, not for restriction or as an excluded requirement, and other components can be added therein, such as adding other control valves before the compressor. For example, the flow path leading to the evaporator includes a throttle element before the evaporator, and even has a control valve, etc. Herein, the second duct 104 of the first heat exchange part is in communication with the outlet of the throttle element 110, but there may not be an opening in case of facing the bridging member, and the figure is only to illustrate the location of the passage. These technical solutions may be modified according to the actual system, the connection situation is subject to the specific technical solution. For example, if the first port is in communication with the second port, it does not exclude the case that the first port is also connected with other ports at the same time.

It should be noted that the above embodiments are only used to illustrate the present application, and not to limit the technical solution described according to the present application, such as the definition of directionality such as "front", "rear", "left", "right", "up" and "down". This specification has described the present application in detail with reference to the above embodiments, however, those skilled in the art should understand that they can still modify or equivalently replace the present application, and all technical solutions and improvements that do not depart from the spirit and scope of the present application should be covered within the scope claimed by the claims of the present application.

The invention claimed is:

1. A heat exchange assembly, comprising a first heat exchange part, a bridging member and a second heat exchange part, wherein the bridging member is at least partially located between the first heat exchange part and the second heat exchange part, wherein the first heat exchange part, the bridging member and the second heat exchange part are fixed by welding; wherein the first heat exchange part has a heat exchange core body, wherein the first heat exchange part comprises at least two fluid flow passages, which are not in communication with each other;

wherein the heat exchange assembly comprises a first port, a second port, and a third port; wherein the first heat exchange part comprises a first port part and a second port part; wherein the first port part has the first port, and the second port part has the second port; wherein the bridging member comprises a third port part, and the third port part is provided with the third port; wherein the bridging member comprises a hole and/or a groove in communication with the third port, wherein the hole and/or groove of the bridging member being in communication with the third port is at least in communication with one of the first heat exchange part and the second heat exchange part for communication; wherein the bridging member comprises two holes or grooves facing the first heat exchange part for communication; wherein the bridging member comprises at least two holes or grooves in communication with the second heat exchange part, wherein openings of the at least two holes or grooves of the bridging member that are capable of being in communication with the second heat exchange part face the second heat exchange part;

wherein the second heat exchange part comprises a third duct and a fourth duct that are in fluid communication with each other;

the heat exchange assembly further comprises a connecting member, the connecting member is located on a side of the second heat exchange part away from the bridging member and has a fifth port;

the third port is in communication with the third duct through one of the at least two holes or grooves of the bridging member in communication with the second heat exchange part, and the fourth duct is in communication with the fifth port and another of the at least two holes or grooves of the bridging member in communication with the second heat exchange part, respectively;

another of the at least two holes or grooves of the bridging member in communication with the second heat exchange part is in communication with one of the two holes or grooves of the bridging member facing the first heat exchange part for communication, so that a fluid flowing through the third port can be divided into two parts when flowing to the fourth duct: one part of the fluid flows out the heat exchange assembly through the fifth port of the connecting member, and the other part of the fluid flows into the first heat exchange part through another of the at least two holes or grooves of the bridging member in communication with the second heat exchange part.

2. The heat exchange assembly according to claim 1, wherein the heat exchange assembly further comprises a throttle element, wherein the throttle element is fixedly arranged or position limitedly arranged with the first heat exchange part, wherein the connecting member is fixedly arranged with the second heat exchange part, wherein the heat exchange assembly further comprises a fourth port, and a sixth port, wherein the connecting member has the fourth port, the fifth port, and the sixth port;

wherein the first heat exchange part comprises a first duct in communication with one of the at least two fluid flow passages of the first heat exchange part, one of the holes or grooves of the bridging member facing the first heat exchange part for communication is in communication with the throttle element, the other one of the holes or grooves of the holes or grooves of the bridging member facing the first heat exchange part for communication is in communication with the first duct of the first heat exchange part.

3. The heat exchange assembly according to claim 1, wherein the heat exchange assembly comprises a throttle element, wherein the throttle element is fixedly arranged or position limited arranged with the bridging member, the bridging member comprises a mounting part, wherein the mounting part is used for fixing or position limiting the throttle element; wherein the two holes and/or grooves of the bridging member facing or close to the first heat exchange part for communication comprise a hole, wherein the hole is located in the mounting part or is part of the mounting part, wherein an outlet of the throttle element is in communication with a second duct of the first heat exchange part through the hole located in the mounting part, wherein the other of the two holes and/or grooves of the bridging member facing the first heat exchange part for communication is in communication with a first duct of the first heat exchange part; wherein the second heat exchange part further comprises a first duct of the second heat exchange part, one of the two holes or grooves of the bridging member which is in communication with the second heat exchange part is in communication with the first duct of the second heat exchange part; wherein the bridging member has holes and/or grooves in communication with an inlet of the throttle element, wherein the inlet of the throttle element is in communication with the fourth duct of the second heat exchange part through the hole and/or groove.

4. The heat exchange assembly according to claim 3, wherein the bridging member comprises three holes or grooves that are in communication with the second heat exchange part: wherein the first duct of the first heat exchange part is in communication with the first duct of the second heat exchange part through the holes and/or grooves of the bridging member, wherein the third port of the heat exchange assembly is in communication with the third duct of the second heat exchange part through another hole and/or groove of the bridging member; wherein the connecting member is located on a side of the second heat exchange part away from the bridging member; wherein the connecting member has a fourth port, and a sixth port; wherein the fourth port is in communication with the first duct of the second heat exchange part, wherein the fifth port is in communication with the fourth duct of the second heat exchange part, wherein the sixth port is in communication with the second duct of the second heat exchange part.

5. The heat exchange assembly according to claim 4, wherein the second heat exchange part is no larger than the first heat exchange part, wherein the mounting part at least partially protrudes from the second heat exchange part; wherein the third port part at least partially protrudes from the second heat exchange part; wherein the bridging member has corresponding holes for communication on a side opposite to the first heat exchange part, wherein the hole is close to the first duct of the first heat exchange part, wherein the hole corresponds to or is in communication with the position of the first duct of the first heat exchange part; wherein the hole of the bridging member located in the mounting part corresponds to or is in communication with the position of the second duct of the first heat exchange part; wherein the bridging member is further provided with a groove on a side opposite to the first heat exchange part, wherein the groove is relatively close to the mounting part, wherein the bridging member comprises through holes; wherein one side of the groove has the through holes, or one side of the groove is in communication with the through hole; wherein an inclined hole is further provided in the other side of the groove, wherein the inclined hole is in communication with the inlet of the throttle element or with the space where the inlet of the throttle element is located, wherein the inlet of the throttle element is in communication with the groove through the inclined hole, wherein the inlet of the throttle element is in communication with the fourth duct of the second heat exchange part through the inclined hole, the groove and the hole.

6. The heat exchange assembly according to claim 1, wherein the hole and/or groove being in communication with the third port is provided on a side of the bridging member facing the second heat exchange part, wherein the hole and/or groove are arranged to the third port part, wherein a depth of at least part of the hole and/or groove is greater than or equal to half a thickness of the bridging member, wherein at least part of the hole and/or groove corresponds to or is in communication with the third duct of the second heat exchange part; wherein the holes and/or grooves are not in communication with other holes and grooves of the bridging member for communication.

7. The heat exchange assembly according to claim 1, wherein the bridging member is provided with a guide hole on a side facing the second heat exchange part, wherein the guide hole is in communication with the third port, wherein the guide hole is arranged to the third port part, wherein a depth of the guide hole is greater than or equal to one third of the thickness of the bridging member and less than two thirds of the thickness of the bridging member, wherein the guide hole corresponds to or is in communication with the third duct of the second heat exchange part; wherein the bridging member further comprises a through hole, a first groove, a second groove, and a guide part, wherein the guide part comprises a hole and a groove, wherein the first groove is arranged on a side facing the second heat exchange part, wherein the second groove and the groove of the guide part are arranged on a side facing the first heat exchange part; wherein the first groove is in communication with the second groove through the through hole; wherein the first groove is in communication with the fourth duct of the second heat exchange part; wherein the first heat exchange part comprises a first duct in communication with one of the at least two fluid flow passages of the first heat exchange part, and the second heat exchange part further comprises a first duct of the second heat exchange part, the first duct of the first heat exchange part is in communication with the first duct of the second heat exchange part through the guide part of the bridging member; wherein a side of the bridging member facing the first heat exchange part is defined as a front side, and a side of the bridging member facing the second heat exchange part is defined as a back side, wherein a projection of the first groove to the front side is at least partially located in the groove of the guide part, wherein a projection of the guide hole to the front side is at least partially located in the second groove.

8. The heat exchange assembly according to claim 1, wherein a side of the bridging member facing the first heat exchange part is defined as a front side, and a side of the bridging member facing the second heat exchange part is defined as a back side, wherein the bridging member is provided with a guide groove and two holes on the back side: a smaller hole and a larger hole, wherein the larger hole is greater than or equal to the smaller hole, wherein the guide groove is in communication with the third port, wherein the guide groove comprises a first part and a second part, wherein the first part is relatively close to the third port part, wherein the second part is relatively far from the third port part; wherein a depth of at least part of the first part is greater than a depth of the second part, wherein at least part of the first part close to the third port part has a depth greater than or equal to half of the thickness of the bridging member, wherein the first part is in communication with the third port;

wherein the second heat exchange part further comprises a first duct of the second heat exchange part, the second heat exchange part has openings of the first duct, the third duct and the fourth duct of the second heat exchange part on a side opposite to the bridging member, wherein the guide groove, the smaller hole and the larger hole of the bridging member are in communication with one of the first duct, the third duct and the fourth duct of the second heat exchange part, respectively; wherein the bridging member has two grooves on a side opposite to the first heat exchange part: a third groove and a fourth groove, wherein the third groove is in communication with the smaller hole, wherein the fourth groove is in communication with the larger hole;

wherein the first heat exchange part comprises a first duct in communication with one of the at least two fluid flow passages of the first heat exchange part, the first duct of the first heat exchange part is in communication with the first duct of the second heat exchange part through the fourth groove and the larger hole, and/or, the first duct of the first heat exchange part is in communication with the fourth duct of the second heat exchange part through the third groove and the smaller hole;

wherein a projection of one of the guide groove and the third port to the front side is at least partially located in the third groove, wherein the projection of the guide groove to the front side is at least partially located in the fourth groove.

9. The heat exchange assembly according to claim 1, wherein the bridging member has a first matching part and a second matching part, wherein the first heat exchange part has a matching part, wherein the matching part of the first heat exchange part is correspondingly matched with the first matching part of the bridging member; wherein the second heat exchange part has a matching part, wherein the matching part of the second heat exchange part is correspondingly matched with the second matching part of the bridging member; wherein the matching part of the first heat exchange part, the matching part of the second heat exchange part, and the two matching parts of the bridging member comprise flat parts; wherein openings of the two holes or grooves facing the first heat exchange part are located inside the first matching part; wherein the openings of the at least two holes or grooves that are capable of being in communication with the second heat exchange part are located inside the second matching part.

10. The heat exchange assembly according to claim 1, wherein the first heat exchange part comprises ducts, the bridging member further comprises at least a weight-reducing hole; wherein the weight-reducing hole is not in communication with the duct of the first heat exchange part and the third duct and the fourth duct of the second heat exchange part, wherein the weight-reducing hole is not in communication with the hole or groove of the bridging member for communication; wherein the distance between the weight-reducing hole and the hole or groove used for communication of the bridging member is greater than or equal to 1.5 mm, and the hole or groove faces the first heat exchange part; wherein the distance between the weight-reducing hole and the hole or groove used for communication, which faces the second heat exchange part, of the bridging member is greater than or equal to 1.5 mm.

11. The heat exchange assembly according to claim 10, wherein the number of weight-reducing holes is more than two, wherein at least one of the weight-reducing holes is non-circular; wherein the bridging member is further provided with at least one notch.

12. The heat exchange assembly according to claim 11, wherein a part of the first matching part of the bridging member is provided between the weight-reducing hole and the hole or groove of the bridging member facing the first heat exchange part for communication, a part of the second matching part of the bridging member is provided between the weight-reducing hole and the hole or groove of the bridging member facing the second heat exchange part for communication.

13. The heat exchange assembly according to claim 2, wherein the hole and/or groove being in communication with the third port is provided on a side of the bridging member facing the second heat exchange part, wherein the hole and/or groove are arranged to the third port part, wherein a depth of at least part of the hole and/or groove is greater than or equal to half a thickness of the bridging member, wherein at least part of the hole and/or groove corresponds to or is in communication with the third duct of the second heat exchange part; wherein the holes and/or grooves are not in communication with other holes and grooves of the bridging member for communication.

14. The heat exchange assembly according to claim 3, wherein the bridging member is provided with holes and/or grooves being in communication with the third port on a side facing the second heat exchange part, wherein the holes and/or grooves are arranged close to the third port part, wherein a depth of at least part of the holes and/or grooves is greater than or equal to half a thickness of the bridging member, wherein at least part of the opening of the hole and/or groove corresponds to or is in communication with the third duct of the second heat exchange part; wherein the holes and/or grooves are not in communication with other holes and grooves of the bridging member for communication.

15. The heat exchange assembly according to claim 2, wherein the bridging member is provided with a guide hole on a side facing the second heat exchange part, wherein the guide hole is in communication with the third port, wherein the guide hole is arranged to the third port part, wherein a depth of the guide hole is greater than or equal to one third of the thickness of the bridging member and less than two thirds of the thickness of the bridging member, wherein the guide hole corresponds to or is in communication with the third duct of the second heat exchange part; wherein the bridging member further comprises a through hole, a first groove, a second groove, and a guide part, wherein the guide part comprises a hole and a groove, wherein the first groove is arranged on a side facing the second heat exchange part, wherein the second groove and the groove of the guide part are arranged on a side facing the first heat exchange part; wherein the first groove is in communication with the second groove through the through hole; wherein the first groove is in communication with the fourth duct of the second heat exchange part; wherein the second heat exchange part further comprises a first duct of the second heat exchange part, the first duct of the first heat exchange part is in communication with the first duct of the second heat exchange part through the guide part of the bridging member; wherein a side of the bridging member facing the first heat exchange part is defined as a front side, and a side of the bridging member facing the second heat exchange part is defined as a back side, wherein a projection of the first groove to the front side is at least partially located in the groove of the guide part, wherein a projection of the guide hole to the front side is at least partially located in the second groove.

16. The heat exchange assembly according to claim 2, wherein a side of the bridging member facing the first heat exchange part is defined as a front side, and a side of the bridging member facing the second heat exchange part is defined as a back side, wherein the bridging member is provided with a guide groove and two holes on the back side: a smaller hole and a larger hole, wherein the larger hole is greater than or equal to the smaller hole, wherein the guide groove is in communication with the third port, wherein the guide groove comprises a first part and a second part, wherein the first part is relatively close to the third port part, wherein the second part is relatively far from the third port part; wherein a depth of at least part of the first part is greater than a depth of the second part, wherein at least part of the first part close to the third port part has a depth greater than or equal to half of the thickness of the bridging member, wherein the first part is in communication with the third port;

wherein the second heat exchange part further comprises a first duct of the second heat exchange part, the second heat exchange part has openings of the first duct, the third duct and the fourth duct of the second heat exchange part on a side opposite to the bridging member, wherein the guide groove, the smaller hole and the larger hole of the bridging member are in communication with one of the first duct, the third duct and the fourth duct of the second heat exchange part, respectively; wherein the bridging member has two grooves on a side opposite to the first heat exchange part: a third groove and a fourth groove, wherein the third groove is in communication with the smaller hole, wherein the fourth groove is in communication with the larger hole;

wherein the first duct of the first heat exchange part is in communication with the first duct of the second heat exchange part through the fourth groove and the larger hole, and/or, the first duct of the first heat exchange part is in communication with the fourth duct of the second heat exchange part through the third groove and the smaller hole;

wherein a projection of one of the guide groove and the third port to the front side is at least partially located in the third groove, wherein the projection of the guide groove to the front side is at least partially located in the fourth groove.

17. The heat exchange assembly according to claim 2, wherein the bridging member has a first matching part and a second matching part, wherein the first heat exchange part has a matching part, wherein the matching part of the first heat exchange part is correspondingly matched with the first matching part of the bridging member; wherein the second heat exchange part has a matching part, wherein the matching part of the second heat exchange part is correspondingly matched with the second matching part of the bridging member; wherein the matching part of the first heat exchange part, the matching part of the second heat exchange part, and the two matching parts of the bridging member comprise flat parts; wherein openings of the two holes or grooves facing the first heat exchange part are located inside the first matching part; wherein the openings of the at least two holes or grooves that are capable of being in communication with the second heat exchange part are located inside the second matching part.

18. The heat exchange assembly according to claim 2, wherein the bridging member further comprises at least a weight-reducing hole; wherein the weight-reducing hole is not in communication with the duct of the first heat exchange part and the third duct and the fourth duct of the second heat exchange part, wherein the weight-reducing hole is not in communication with the hole or groove of the bridging member for communication; wherein the distance between the weight-reducing hole and the hole or groove used for communication of the bridging member is greater than or equal to 1.5 mm, and the hole or groove faces the first heat exchange part; wherein the distance between the weight-reducing hole and the hole or groove used for communication, which faces the second heat exchange part, of the bridging member is greater than or equal to 1.5 mm.

19. The heat exchange assembly according to claim 13, wherein the bridging member has a first matching part and a second matching part, wherein the first heat exchange part has a matching part, wherein the matching part of the first heat exchange part is correspondingly matched with the first matching part of the bridging member; wherein the second heat exchange part has a matching part, wherein the matching part of the second heat exchange part is correspondingly matched with the second matching part of the bridging member; wherein the matching part of the first heat exchange part, the matching part of the second heat exchange part, and the two matching parts of the bridging member comprise flat parts; wherein openings of the two holes or grooves facing the first heat exchange part are located inside the first matching part; wherein the openings of the at least two holes or grooves of the bridging member that are capable of being in communication with the second heat exchange part are located inside the second matching part.

20. The heat exchange assembly according to claim 13, wherein the bridging member further comprises at least a weight-reducing hole; wherein the weight-reducing hole is not in communication with the duct of the first heat exchange part and the third duct and the fourth duct of the second heat exchange part, wherein the weight-reducing hole is not in communication with the hole or groove of the bridging member for communication; wherein the distance between the weight-reducing hole and the hole or groove used for communication of the bridging member is greater than or equal to 1.5 mm, and the hole or groove faces the first heat exchange part; wherein the distance between the weight-reducing hole and the hole or groove used for communication, which faces the second heat exchange part, of the bridging member is greater than or equal to 1.5 mm.

* * * * *